US010798028B2

(12) United States Patent
Fung et al.

(10) Patent No.: US 10,798,028 B2
(45) Date of Patent: Oct. 6, 2020

(54) BOT INTERACTION

(71) Applicant: Google LLC, Mountain View, CA (US)

(72) Inventors: Shelbian Fung, Mountain View, CA (US); Erika Palmer, Mountain View, CA (US); Amit Fulay, Mountain View, CA (US); Anton Volkov, Mountain View, CA (US); Ori Gershony, Mountain View, CA (US); Jeremy Newton-Smith, Mountain View, CA (US); Ryan Palmer, Mountain View, CA (US); Mark Chang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 106 days.

(21) Appl. No.: 15/709,439

(22) Filed: Sep. 19, 2017

(65) Prior Publication Data

US 2018/0083894 A1   Mar. 22, 2018

Related U.S. Application Data

(60) Provisional application No. 62/397,318, filed on Sep. 20, 2016.

(51) Int. Cl.
*G06F 15/16* (2006.01)
*H04L 12/58* (2006.01)

(52) U.S. Cl.
CPC .......... *H04L 51/02* (2013.01); *H04L 51/046* (2013.01); *H04L 51/08* (2013.01); *H04L 51/10* (2013.01); *H04L 51/32* (2013.01); *H04L 51/12* (2013.01)

(58) Field of Classification Search
CPC .......................... H04L 29/08072; H04L 29/06
(Continued)

(56) References Cited

U.S. PATENT DOCUMENTS 7,630,986 B1 * 12/2009 Herz .................... G06Q 10/10
8,393,948 B2 * 3/2013 Allen .................. G07F 17/3223
463/16
(Continued)

FOREIGN PATENT DOCUMENTS

JP   2014-035771   2/2014
JP   2014-225268   12/2014
KR  2015-0046100   4/2015

OTHER PUBLICATIONS

PCT, "International Search Report and Written Opinion PCT application No. PCT/US2017/052336," dated Feb. 15, 2018.
(Continued)

*Primary Examiner* — Khanh Q Dinh
(74) *Attorney, Agent, or Firm* — IP Spring

(57) ABSTRACT

Systems, methods and computer readable media for bot interaction are described. For example, some implementations can include a computer-executed method including providing a messaging application, on a first computing device associated with a first user, to enable communication between the first user and at least one other user. The method can also include detecting, at the messaging application, a user request, and programmatically determining that an operation in response to the user request requires sharing of data associated with the first user. The method can further include causing a permission interface to be rendered in the messaging application on the first computing device, the permission interface enabling the first user to approve or prohibit sharing of the data associated with the first user, and upon receiving user input from the first user indicating approval of the sharing of the data associated with the first user, accessing the data associated with the first user and sharing the data associated with the first user within the messaging application in response to the user request.

20 Claims, 16 Drawing Sheets

(58) Field of Classification Search
USPC ........ 709/203, 220, 224, 226, 232, 206, 228
See application file for complete search history.

(56) References Cited

U.S. PATENT DOCUMENTS

| | | | |
|---|---|---|---|
| 8,984,080 B1 | 3/2015 | Curtis et al. | |
| 9,294,268 B2* | 3/2016 | von Mueller | G06Q 20/12 |
| 10,007,910 B2* | 6/2018 | von Mueller | G06Q 20/12 |
| 10,447,711 B2* | 10/2019 | Kaminsky | H04L 63/14 |
| 10,617,948 B2* | 4/2020 | Schwarck | A63F 9/183 |
| 2005/0138132 A1 | 6/2005 | Zhou et al. | |
| 2008/0120129 A1* | 5/2008 | Seubert | G06Q 10/06 |
| | | | 705/35 |
| 2009/0254971 A1* | 10/2009 | Herz | G06Q 10/10 |
| | | | 726/1 |
| 2012/0042263 A1* | 2/2012 | Rapaport | G06Q 50/01 |
| | | | 715/753 |
| 2012/0202587 A1* | 8/2012 | Allen | G07F 17/3223 |
| | | | 463/25 |
| 2013/0097664 A1* | 4/2013 | Herz | G06Q 10/10 |
| | | | 726/1 |
| 2016/0191554 A1* | 6/2016 | Kaminsky | G06F 21/31 |
| | | | 726/23 |

OTHER PUBLICATIONS

KIPO, Notice of Allowance (with English translation) for Korean Patent Application No. 10-2018-7017883, dated Jan. 4, 2019, 4 pages.
JPO, Office Action for Japanese Patent Application No. 2018-539989, dated May 14, 2019, 2 pages.
KIPO, Notice of Final Rejection for Korean Patent Application No. 10-2018-701788, dated Nov. 9, 2018, 4 pages.
KIPO, Office Action for Korean Patent Application No. 10-2018-7017883, dated Aug. 27, 2018, 4 pages.
International Bureau of WIPO, International Preliminary Report on Patentability for International Patent Application No. PCT/US2017/052336, dated Mar. 26, 2019, 9 pages.
EPO, Communication Under Rules 71(3) EPC for European Patent Application No. 17780571.0, dated Jul. 15, 2019, 7 pages.
JPO, Notice of Allowance (with English translation) for Japanese Patent Application No. 2018-539989, dated Sep. 17, 2019, 2 pages.
KIPO, Notice of Preliminary Rejection (with English translation) for Korean Patent Application No. 10-2018-7036133, dated Jun. 1, 2020, 9 pages.
Indian Patent Office, First Examination Report for Indian Patent Application No. 201847021522, dated Jul. 27, 2020, 6 pages.

* cited by examiner

BOT INTERACTION

RELATED APPLICATIONS

This application claims the benefit of U.S. Application No. 62/397,318, entitled "BOT INTERACTION", and filed on Sep. 20, 2016, which is incorporated herein by reference in its entirety.

BACKGROUND

Users conduct messaging conversations, e.g., chat, instant message, etc. using messaging services. Messaging conversations may be conducted using any user device, e.g., a computer, a mobile device, a wearable devices, etc. As users conduct more conversations and perform more tasks using messaging applications, automated assistance with messaging conversations or tasks (e.g., via a bot or other automated assistant application) may be useful to improve efficiency. While automation may help make messaging communications more efficient for users, there may be a need to manage privacy and permissions relating to when and how a messaging bot accesses user information and what user information the messaging bot is permitted to access and/or share with other users.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations can include a computer-executed method. The method can include providing a messaging application, on a first computing device associated with a first user, to enable communication between the first user and at least one other user. The method can also include detecting, at the messaging application, a user request, and programmatically determining that an operation in response to the user request requires sharing of data associated with the first user. The method can further include causing a permission interface to be rendered in the messaging application on the first computing device, the permission interface enabling the first user to approve or prohibit sharing of the data associated with the first user, and upon receiving user input from the first user indicating approval of the sharing of the data associated with the first user, accessing the data associated with the first user and sharing the data associated with the first user within the messaging application in response to the user request.

In some implementations, the first user is a human user and the at least one other user is an assistive agent. Detecting the user request can include analyzing, by an assistive agent, one or more messages received in the messaging application wherein the messages are sent from the first user to the assistive agent. The one or more messages can include one or more of a text message, a multimedia message, and a command to the assistive agent.

The method can also include automatically invoking the assistive agent based on one or more actions of the first user. The assistive agent can be invoked in response to one or more of a special character command, user selection of a user interface callout element associated with the assistive agent, user selection of an avatar corresponding to the assistive agent, and user selection of an auto reply suggestion provided by the assistive agent.

In some implementations, the first user can include a human user and the at least one other user can include a second human user, different from the first user, associated with a second computing device, and the permission interface can be rendered in the messaging application on the first computing device associated with the first user and the permission interface is not displayed on the second computing device associated with the second human user.

The first user can include a human user and the at least one other user can include a second human user, different from the first user, and an assistive agent, and the user request is received from the first computing device associated with the first user, the method further comprising, in response to the user request, initiating a separate conversation in the messaging application, wherein the separate conversation includes the first user and the assistive agent, and excludes the second human user.

The method can further include providing one or more suggestions in the first messaging application based on input from at least one of the first user and the at least one other user. The method can further include causing the one or more suggestions to be displayed in the messaging application. The one or more suggestions can be rendered as suggestion elements that, when selected by the first user, cause details of a corresponding suggestion to be displayed.

Some implementations can include a computer-executed method, including detecting, at a messaging application, user input corresponding to selection of a previously displayed acknowledgement message from an assistive agent, wherein the previously displayed acknowledgement message is associated with one or more previously displayed suggested auto reply responses. The method can also include causing the previously displayed suggested auto reply responses to be displayed, and receiving an indication that a given one of the one or more previously displayed suggested auto reply responses was selected by the user. The method can further include sending the given one of the one or more previously displayed suggested auto reply responses to the assistive agent and to a second user that participates in a conversation within the messaging application.

The method can also include invoking the assistive agent in response to the user input. In some implementations, the conversation can include the user and at least one other user, wherein the user is a first human user and the at least one other user includes a second human user, different from the first human user, the first human user associated with a first computing device and the second human user associated with a second computing device, and wherein the previously displayed message and the one or more suggested auto reply responses is initially rendered in the messaging application on the first computing device associated with the first human user, and wherein providing the one or more suggested auto reply responses to one or more of the assistive agent and the conversation within the messaging application includes providing the one or more suggested auto reply responses in the messaging application.

Some implementations can include a system comprising one or more hardware processors coupled to a non-transitory computer-readable medium having stored thereon on software instructions that, when executed by the one or more processors, causes the one or more processors to perform operations. The operations can include receiving a user request from a messaging application on a first computing device associated with a first user, the messaging application configured to enable communication between the first user and at least one other user, and programmatically determining that an operation in response to the user request requires sharing of data associated with the first user. The operations can also include causing a permission interface to be rendered in the messaging application on the first computing device, the permission interface enabling the first user to approve or prohibit sharing of the data associated with the first user, and upon receiving user input from the first user indicating approval of the sharing of the data associated with the first user, accessing the data associated with the first user and sharing the data associated with the first user within the messaging application in response to the user request.

In some implementations, the first user can include a human user and the at least one other user can include an assistive agent. Detecting the user request can include analyzing, at an assistive agent, one or more messages received in the messaging application from the first user to the assistive agent. The first user can include a human user and the at least one other user can include a second human user, different from the first user, associated with a second computing device, and wherein the permission interface is rendered in the messaging application on the first computing device associated with the first user and the permission interface is not displayed on the second computing device associated with the second human user.

In some implementations, the first user can include a human user and the at least one other user can include a second human user, different from the first user, and an assistive agent and wherein the user request is received from the first computing device associated with the first user, the operations further including, in response to the user request, initiating a separate conversation in the messaging application, wherein the separate conversation includes the first user and the assistive agent, and does not include the second human user.

The operations can further include providing one or more suggestions to the first messaging application based on input from at least one of the first user and the at least one other user.

DETAILED DESCRIPTION

One or more implementations described herein relate general to user interaction with assistive agents (or bots), and in particular to identifying a bot, user privacy management for messaging application bots, and/or recalling previous bot suggestions.

Figure 1:
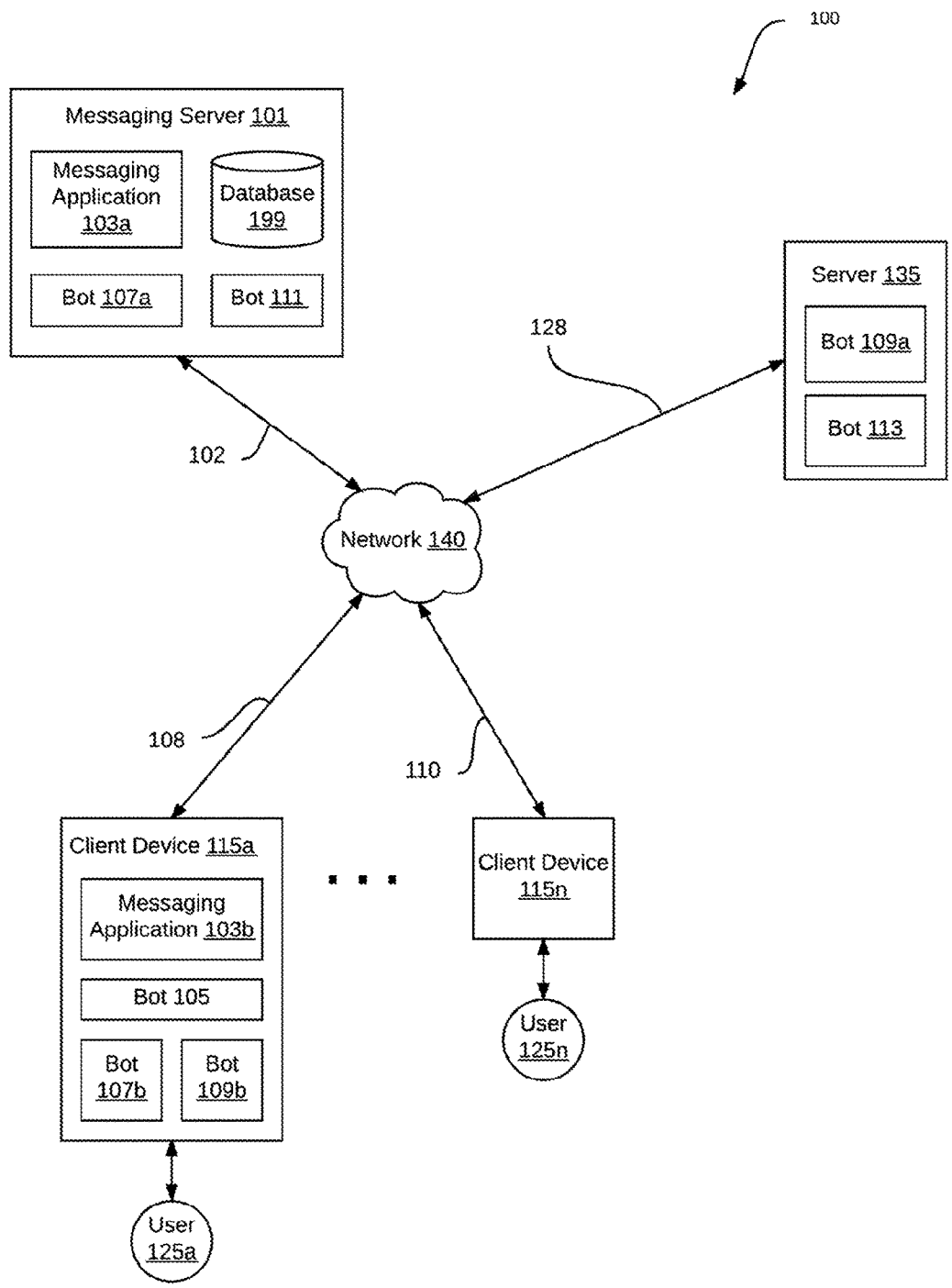
FIG. 1 shows a block diagram of an example environment in which messages may be exchanged between users and bots in accordance with some implementations.

FIG. 1 illustrates a block diagram of an example environment 100 for providing messaging services that enable and, in some embodiments, provide automatic assistive agents, e.g., bots. The exemplary environment 100 includes messaging server 101, one or more client devices 115a, 115n, server 135, and network 140. Users 125a-125n may be associated with respective client devices 115a, 115n. Server 135 may be a third-party server, e.g., controlled by a party different from the party that provides messaging services. In various implementations, server 135 may implement bot services, as described in further detail below. In some implementations, environment 100 may not include one or more servers or devices shown in FIG. 1 or may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, messaging server 101, client devices 115, and server 135 are communicatively coupled via a network 140. In various implementations, network 140 may be a conventional type, wired or wireless, and may have numerous different configurations including a star configuration, token ring configuration or other configurations. Furthermore, network 140 may include a local area network (LAN), a wide area network (WAN) (e.g., the Internet), and/or other interconnected data paths across which multiple devices may communicate. In some implementations, network 140 may be a peer-to-peer network. Network 140 may also be coupled to or include portions of a telecommunications network for sending data in a variety of different communication protocols. In some implementations, network 140 includes Bluetooth® communication networks, Wi-Fi®, or a cellular communications network for sending and receiving data including via short messaging service (SMS), multimedia messaging service (MMS), hypertext transfer protocol (HTTP), direct data connection, email, etc. Although FIG. 1 illustrates one network 140 coupled to client devices 115, messaging server 101, and server 135, in practice one or more networks 140 may be coupled to these entities.

Messaging server 101 may include a processor, a memory, and network communication capabilities. In some implementations, messaging server 101 is a hardware server. In some implementation, messaging server 101 may be implanted in a virtualized environment, e.g., messaging server 101 may be a virtual machine that is executed on a hardware server that may include one or more other virtual machines. Messaging server 101 is communicatively coupled to the network 140 via signal line 102. Signal line 102 may be a wired connection, such as Ethernet, coaxial cable, fiber-optic cable, etc., or a wireless connection, such as Wi-Fi, Bluetooth, or other wireless technology. In some implementations, messaging server 101 sends and receives data to and from one or more of client devices 115a-115n, server 135, and bot 113 via network 140. In some implementations, messaging server 101 may include messaging application 103a that provides client functionality to enable a user (e.g., any of users 125) to exchange messages with other users and/or with a bot. Messaging application 103a may be a server application, a server module of a client-server application, or a distributed application (e.g., with a corresponding client messaging application 103b on one or more client devices 115).

Messaging server 101 may also include database 199 which may store messages exchanged via messaging server 101, data and/or configuration of one or more bots, and user data associated with one or more users 125, all upon explicit permission from a respective user to store such data. In some embodiments, messaging server 101 may include one or more assistive agents, e.g., bots 107a and 111. In other embodiments, the assistive agents may be implemented on the client devices 115a-n and not on the messaging server 101.

Messaging application 103a may be code and routines operable by the processor to enable exchange of messages among users 125 and one or more bots 105, 107a, 107b, 109a, 109b, 111, and 113. In some implementations, messaging application 103a may be implemented using hardware including a field-programmable gate array (FPGA) or an application-specific integrated circuit (ASIC). In some implementations, messaging application 103a may be implemented using a combination of hardware and software.

In various implementations, when respective users associated with client devices 115 provide consent for storage of messages, database 199 may store messages exchanged between one or more client devices 115. In some implementations, when respective users associated with client devices 115 provide consent for storage of messages, database 199 may store messages exchanged between one or more client devices 115 and one or more bots implemented on a different device, e.g., another client device, messaging server 101, and server 135, etc. In the implementations where one or more users do not provide consent, messages received and sent by those users are not stored.

In some implementations, messages may be encrypted, e.g., such that only a sender and recipient of a message can view the encrypted messages. In some implementations, messages are stored. In some implementations, database 199 may further store data and/or configuration of one or more bots, e.g., bot 107a, bot 111, etc. In some implementations when a user 125 provides consent for storage of user data (such as social network data, contact information, images, etc.) database 199 may also store user data associated with the respective user 125 that provided such consent.

In some implementations, messaging application 103a/103b may provide a user interface that enables a user 125 to create new bots. In these implementations, messaging application 103a/103b may include functionality that enables user-created bots to be included in conversations between users of messaging application 103a/103b.

Client device 115 may be a computing device that includes a memory and a hardware processor, for example, a camera, a laptop computer, a tablet computer, a mobile telephone, a wearable device, a mobile email device, a portable game player, a portable music player, a reader device, head mounted display or other electronic device capable of wirelessly accessing network 140.

In the illustrated implementation, client device 115a is coupled to the network 140 via signal line 108 and client device 115n is coupled to the network 140 via signal line 110. Signal lines 108 and 110 may be wired connections, e.g., Ethernet, or wireless connections, such as Wi-Fi, Bluetooth, or other wireless technology. Client devices 115a, 115n are accessed by users 125a, 125n, respectively. The client devices 115a, 115n in FIG. 1 are used by way of example. While FIG. 1 illustrates two client devices, 115a and 115n, the disclosure applies to a system architecture having one or more client devices 115.

In some implementations, client device 115 may be a wearable device worn by a user 125. For example, client device 115 may be included as part of a clip (e.g., a wristband), part of jewelry, or part of a pair of glasses. In another example, client device 115 can be a smartwatch. In various implementations, user 125 may view messages from the messaging application 103a/103b on a display of the device, may access the messages via a speaker or other output device of the device, etc. For example, user 125 may view the messages on a display of a smartwatch or a smart wristband. In another example, user 125 may access the messages via headphones (not shown) coupled to or part of client device 115, a speaker of client device 115, a haptic feedback element of client device 115, etc.

In some implementations, messaging application 103b is stored on a client device 115a. In some implementations, messaging application 103b (e.g., a thin-client application, a client module, etc.) may be a client application stored on client device 115a with a corresponding a messaging application 103a (e.g., a server application, a server module, etc.) that is stored on messaging server 101. For example, messaging application 103b may transmit messages created by user 125a on client device 115a to messaging application 103a stored on messaging server 101.

In some implementations, messaging application 103a may be a standalone application stored on messaging server 101. A user 125a may access the messaging application 103a via a web page using a browser or other software on client device 115a. In some implementations, messaging application 103b that is implemented on the client device 115a may include the same or similar modules as those included on messaging server 101. In some implementations, messaging application 103b may be implemented as a standalone client application, e.g., in a peer-to-peer or other configuration where one or more client devices 115 include functionality to enable exchange of messages with other client devices 115. In these implementations, messaging server 101 may include limited or no messaging functionality (e.g., client authentication, backup, etc.). In some implementations, messaging server 101 may implement one or more bots, e.g., bot 107a and bot 111.

Server 135 may include a processor, a memory and network communication capabilities. In some implementations, server 135 is a hardware server. Server 135 is communicatively coupled to the network 140 via signal line 128. Signal line 128 may be a wired connection, such as Ethernet, coaxial cable, fiber-optic cable, etc., or a wireless connection, such as Wi-Fi, Bluetooth, or other wireless technology. In some implementations, server 135 sends and receives data to and from one or more of messaging server 101 and client devices 115 via network 140. Although server 135 is illustrated as being one server, various implementations may include one or more servers 135. Server 135 may implement one or more bots as server applications or server modules, e.g., bot 109a and bot 113.

In various implementations, server 135 may be part of the same entity that manages messaging server 101, e.g., a provider of messaging services. In some implementations, server 135 may be a third party server, e.g., controlled by an entity different than the entity that provides messaging application 103a/103b. In some implementations, server 135 provides or hosts bots.

A bot is an automated service, implemented on one or more computers, that users interact with primarily through text, e.g., via messaging application 103a/103b. A bot may be implemented by a bot provider such that the bot can interact with users of various messaging applications. In some implementations, a provider of messaging application 103a/103b may also provide one or more bots. In some implementations, bots provided by the provider of messaging application 103a/103b may be configured such that the bots can be included in other messaging applications, e.g., provided by other providers. A bot may provide several advantages over other modes. For example, a bot may permit a user to try a new service (e.g., a taxi booking service, a restaurant reservation service, etc.) without having to install an application on a client device, or accessing a website. Further, a user may interact with a bot via text, which requires minimal or no learning, compared with that required to use a website, software application, a telephone call, e.g., to an interactive voice response (IVR) service, or other manners of interacting with a service. Incorporating a bot within a messaging service or application may also permit users to collaborate with other users to accomplish various tasks such as travel planning, shopping, scheduling events, obtaining information, etc. within the messaging service, and eliminate cumbersome operations such as switching between various applications (e.g., a taxi booking application, a restaurant reservation application, a calendar application, etc.) or websites to accomplish the tasks.

A bot may be implemented as a computer program or application (e.g., a software application) that is configured to interact with one or more users (e.g., any of the users 125a-n) via messaging application 103a/103b to provide information or to perform specific actions within the messaging application 103. As one example, an information retrieval bot may search for information on the Internet and present the most relevant search result within the messaging app. As another example, a travel bot may have the ability to make travel arrangements via messaging application 103, e.g., by enabling purchase of travel and hotel tickets within the messaging app, making hotel reservations within the messaging app, making rental car reservations within the messaging app, and the like. As another example, a taxi bot may have the ability to call a taxi, e.g., to the user's location (obtained by the taxi bot from client device 115, when a user 125 permits access to location information) without having to invoke or call a separate taxi reservation app. As another example, a coach/tutor bot may tutor a user to instruct the user in some subject matter within a messaging app, e.g., by asking questions that are likely to appear on an examination and providing feedback on whether the user's responses were correct or incorrect. As another example, a game bot may play a game on the opposite side or the same side as a user within a messaging app. As another example, a commercial bot may provide services from a specific merchant, e.g., by retrieving product information from the merchant's catalog and enabling purchase through a messaging app. As another example, an interface bot may interface a remote device or vehicle so that a user of a messaging app can chat with, retrieve information from, and/or provide instructions to the remote device or vehicle.

A bot's capabilities may include understanding a user's intent and executing on it. The user's intent may be understood by analyzing and understanding the user's conversation and its context. A bot may also understand the changing context of a conversation or the changing sentiments and/or intentions of the users based on a conversation evolving over time. For example, if user A suggests meeting for coffee but if user B states that he does not like coffee, then a bot may assign a negative sentiment score for coffee to user B and may not suggest a coffee shop for the meeting.

Implementing bots that can communicate with users of messaging application 103a/103b may provide many advantages. Conventionally, a user may utilize a software application or a website to perform activities such as paying bills, ordering food, booking tickets, etc. A problem with such implementations is that a user is required to install or use multiple software applications, and websites, in order to perform the multiple activities. For example, a user may have to install different software applications to pay a utility bill (e.g., from the utility company), to buy movie tickets (e.g., a ticket reservation application from a ticketing service provider), to make restaurant reservations (e.g., from respective restaurants), or may need to visit a respective website for each activity. Another problem with such implementations is that the user may need to learn a complex user interface, e.g., a user interface implemented using multiple user interface elements, such as windows, buttons, checkboxes, dialog boxes, etc.

Consequently, an advantage of one or more described implementations is that a single application enables a user to perform activities that involve interaction with any number of parties, without being required to access a separate website or install and run software applications, which has a technical effect of reducing consumption of memory, storage, and processing resources on a client device. An advantage of the described implementations is that the conversational interface makes it easier and faster for the user to complete such activities, e.g., without having to learn a complex user interface, which has a technical effect of reducing consumption of computational resources. Another advantage of the described implementations is that implementing bots may enable various participating entities to provide user interaction at a lower cost, which has a technical effect of reducing the need for computational resources that are deployed to enable user interaction, such as a toll-free number implemented using one or more of a communications server, a website that is hosted on one or more web servers, a customer support email hosted on an email server, etc. Another technical effect of described features is a reduction in the problem of consumption of system processing and transmission resources required for completing user tasks across communication networks.

While certain examples herein describe interaction between a bot and one or more users, various types of interactions, such as one-to-one interaction between a bot and a user 125, one-to-many interactions between a bot and two or more users (e.g., in a group messaging conversation), many-to-one interactions between multiple bots and a user, and many-to-many interactions between multiple bots and multiple users are be possible. Further, in some implementations, a bot may also be configured to interact with another bot (e.g., bots 107a/107b, 109a/109b, 111, 113, etc.) via messaging application 103, via direct communication between bots, or a combination. For example, a restaurant reservation bot may interact with a bot for a particular restaurant in order to reserve a table.

In certain embodiments, a bot may use a conversational interface to use natural language to interact conversationally with a user. In certain embodiments, a bot may use a template-based format to create sentences with which to interact with a user, e.g., in response to a request for a restaurant address, using a template such as "the location of restaurant R is L." In certain cases, a user may be enabled to select a bot interaction format, e.g., whether the bot is to use natural language to interact with the user, whether the bot is to use template-based interactions, etc.

In cases in which a bot interacts conversationally using natural language, the content and/or style of the bot's interactions may dynamically vary based on one or more of: the content of the conversation determined using natural language processing, the identities of the users in the conversations, and one or more conversational contexts (e.g., historical information on the user's interactions, connections between the users in the conversation based on a social graph), external conditions (e.g., weather, traffic), the user's schedules, related context associated with the users, and the like. In these cases, the content and style of the bot's interactions is varied based on only such factors for which users participating in the conversation have provided consent.

As one example, if the users of a conversation are determined to be using formal language (e.g., no or minimal slang terms or emojis), then a bot may also interact within that conversation using formal language, and vice versa. As another example, if a user in a conversation is determined (based on the present and/or past conversations) to be a heavy user of emojis, then a bot may also interact with that user using one or more emojis. As another example, if it is determined that two users in a conversation are in remotely connected in a social graph (e.g., having two or more intermediate nodes between them denoting, e.g., that they are friends of friends of friends), then a bot may use more formal language in that conversation. In the cases where users participating in a conversation have not provided consent for the bot to utilize factors such as the users' social graph, schedules, location, or other context associated with the users, the content and style of interaction of the bot may be a default style, e.g., a neutral style, that doesn't require utilization of such factors.

Further, in some implementations, one or more bots may include functionality to engage in a back-and-forth conversation with a user. For example, if the user requests information about movies, e.g., by entering "@moviebot Can you recommend a movie?", the bot "moviebot" may respond with "Are you in the mood for a comedy?" The user may then respond, e.g., "nope" to which the bot may respond with "OK. The sci-fi movie entitled Space and Stars has got great reviews. Should I book you a ticket?" The user may then indicate "Yeah, I can go after 6 pm. Please check if Steve can join". Upon user's consent to the bot accessing information about their contacts and upon the friend Steve's consent to receiving messages from the bot, the bot may send a message to user's friend Steve and perform further actions to book movie tickets at a suitable time.

In certain embodiments, a user participating in a conversation may be enabled to invoke a specific bot or a bot performing a specific task, e.g., by typing a bot name or bot handle (e.g., taxi, @taxibot, @movies, etc.), by using a voice command (e.g., "invoke bankbot", etc.), by activation of a user interface element (e.g., a button or other element labeled with the bot name or handle), etc. Once a bot is invoked, a user 125 may send a message to the bot via messaging application 103a/103b in a manner similar to sending messages to other users 125. For example, to order a taxi, a user may type "@taxibot get me a cab"; to make hotel reservations, a user may type "@hotelbot book a table for 4 at a Chinese restaurant near me."

In certain embodiments, a bot may automatically suggest information or actions within a messaging conversation without being specifically invoked. That is, the users may not need to specifically invoke the bot. In these embodiments, the bot may depend on analysis and understanding of the conversation on a continual basis or at discrete points of time. The analysis of the conversation may be used to understand specific user needs and to identify when assistance should be suggested by a bot. As one example, a bot may search for some information and suggest the answer if it is determined that a user needs information (e.g., based on the user asking a question to another user, based on multiple users indicating they don't have some information). As another example, if it is determined that multiple users have expressed interest in eating Chinese food, a bot may automatically suggest a set of Chinese restaurants in proximity to the users, including optional information such as locations, ratings and links to the websites of the restaurants.

In certain embodiments, rather than automatically invoking a bot or waiting for a user to explicitly invoke a bot, an automatic suggestion may be made to one or more users in a messaging conversation to invoke one or more bots. In these embodiments, the conversation may be analyzed on a continual basis or at discrete points of time, and the analysis of the conversation may be used to understand specific user needs and to identify when a bot should be suggested within the conversation.

In the embodiments in which a bot may automatically suggest information or actions within a messaging conversation without being specifically invoked, such functionality is disabled, e.g., if one or more users participating in the messaging conversation do not provide consent to a bot performing analysis of the users' conversation. Further, such functionality may also be disabled temporarily based on user input. For example, when the users indicate that a conversation is private or sensitive, analysis of conversational context is suspended until users provide input for the bot to be activated. Further, indications that analysis functionality is disabled may be provided to participants in the conversation, e.g., with a user interface element.

In various implementations, a bot may be implemented in a variety of configurations. For example, as shown in FIG. 1, bot 105 is implemented on client device 115a. In this example, the bot may be a module in a software application that is local to client device 115a. For example, if a user has installed a taxi hailing application on client device 115a, bot functionality may be incorporated as a module in the taxi hailing application. In this example, a user may invoke a taxi bot, e.g., by sending a message "@taxibot get me a cab." Messaging application 103b may automatically cause the bot module in the taxi hailing application be launched. In this manner, a bot may be implemented locally on a client device such that the user can engage in conversation with the bot via messaging application 103.

In another example shown in FIG. 1, bot 107a is shown implemented on client device 115a and bot 107b is shown as implemented on messaging server 101. In this example, the bot may be implemented, e.g., as a client-server computer program, with portions of the bot functionality provided by each of bot 107a (server module) and bot 107b (client module). For example, if the bot is a scheduling bot with the handle @calendar, user 115*a* may schedule a reminder, by typing "@calendar remind me to pick up laundry in the evening," which may be handled by bot 107*b* (client module). Continuing with this example, if user 115*a* tells the bot "check if Jim is free to meet at 4," bot 107*a* (server module) may contact user Jim (or Jim's scheduling bot) to exchange messages, and provide a response to user 115*a*.

In another example, bot 109*a* (server module) is implemented on server 135 and bot 109*b* (client module) is implemented on client devices 115. In this example, the bot functionality is provided by modules implemented on client devices 115 and server 135, which is distinct from messaging server 101. In some implementations, a bot may be implemented as a distributed application, e.g., with modules distributed across multiple client devices and servers (e.g., client devices 115, server 135, messaging server 101, etc.). In some implementations, a bot may be implemented as a server application, e.g., bot 111 that is implemented on messaging server 101 and bot 113 that is implemented on server 135.

Different implementations such as client-only, server-only, client-server, distributed, etc. may provide different advantages. For example, client-only implementations permit bot functionality to be provided locally, e.g., without network access, which may be advantageous in certain contexts, e.g., when a user is outside of network coverage area or in any area with low or limited network bandwidth. Implementations that include one or more servers, such as server-only, client-server, or distributed configurations may permit certain functionality, e.g., financial transactions, ticket reservations, etc. that may not be possible to provide locally on a client device.

While FIG. 1 shows bots as distinct from messaging application 103, in some implementations, one or more bots may be implemented as part of messaging application 103. In the implementations in which bots are implemented as part of messaging application 103, user permission is obtained before implementing bots. For example, where bots are implemented as part of messaging application 103*a*/103*b*, messaging application 103*a*/103*b* may provide bots that can perform certain activities, e.g., a translation bot that translates incoming and outgoing messages, a scheduling bot that schedules events on a user's calendar, etc. In this example, translation bot is activated only upon user's specific permission. If the user does not provide consent, bots within messaging application 103*a*/103*b* are not implemented (e.g., disabled, removed, etc.). If the user provides consent, a bot or messaging application 103*a*/103*b* may make limited use of messages exchanged between users via messaging application 103*a*/103*b* to provide specific functionality, e.g., translation, scheduling, etc.

In some implementations, third parties distinct from a provider of messaging application 103*a*/103*b* and users 125, may provide bots that can communicate with users 125 via messaging application 103*a*/103*b* for specific purposes. For example, a taxi service provider may provide a taxi bot, a ticketing service may provide a bot that can book event tickets, a bank bot may provide capability to conduct financial transactions, etc.

In implementing bots via messaging application 103, bots are permitted to communicate with users only upon specific user authorization. For example, if a user invokes a bot, the bot can reply, e.g., based on the user's action of invoking the bot. In another example, a user may indicate particular bots or types of bots that may contact the user. For example, a user may permit travel bots to communicate with her, but not provide authorization for shopping bots. In this example, messaging application 103*a*/103*b* may permit travel bots to exchange messages with the user, but filter or deny messages from shopping bots.

Further, in order to provide some functionality (e.g., ordering a taxi, making a flight reservation, contacting a friend, etc.), bots may request that the user permit the bot to access user data, such as location, payment information, contact list, etc. In such instances, a user is presented with options to permit or deny access to the bot. If the user denies access, the bot may respond via a message, e.g., "Sorry, I am not able to book a taxi for you." Further, the user may provide access to information on a limited basis, e.g., the user may permit the taxi bot to access a current location only upon specific invocation of the bot, but not otherwise. In different implementations, the user can control the type, quantity, and granularity of information that a bot can access, and is provided with the ability (e.g., via a user interface) to change such permissions at any time. In some implementations, user data may be processed, e.g., to remove personally identifiable information, to limit information to specific data elements, etc. before a bot can access such data. Further, users can control usage of user data by messaging application 103*a*/103*b* and one or more bots. For example, a user can specify that a bot that offers capability to make financial transactions require user authorization before a transaction is completed, e.g., the bot may send a message "Tickets for the movie Space and Starts are $12 each. Shall I go ahead and book?" or "The best price for this shirt is $125, including shipping. Shall I charge your credit card ending 1234?" etc.

In some implementations, messaging application 103*a*/103*b* may also provide one or more suggestions, e.g., suggested responses, to users 125 via a user interface, e.g., as a button, or other user interface element. Suggested responses may enable faster interaction, e.g., by reducing or eliminating the need for a user to type a response. Suggested responses may enable users to respond to a message quickly and easily, e.g., when a client device lacks text input functionality (e.g., a smartwatch that does not include a keyboard or microphone). Suggested responses may also enable users to respond quickly to messages, e.g., when the user selects suggested response (e.g., by selecting a corresponding a user interface element on a touchscreen). Suggested responses may be generated using predictive models, e.g., machine learning models, that are trained to generate responses.

For example, messaging application 103*a*/103*b* may implement machine learning, e.g., a deep learning model, that can enhance user interaction with messaging application 103. Machine-learning models may be trained using synthetic data, e.g., data that is automatically generated by a computer, with no use of user information. In some implementations, machine-learning models may be trained, e.g., based on sample data, for which permissions to utilize user data for training have been obtained expressly from users. For example, sample data may include received messages and responses that were sent to the received messages. Based on the sample data, the machine-learning model can predict responses to received messages, which may then be provided as suggested responses. User interaction is enhanced, e.g., by reducing burden on the user to compose a response to a received message, by providing a choice of responses that are customized based on the received message and the user's context. For example, when users provide consent, suggested responses may be customized based on the user's prior activity, e.g., earlier messages in a conversation, messages in different conversations, etc. For example, such activity may be used to determine an appropriate suggested response for the user, e.g., a playful response, a formal response, etc. based on the user's interaction style. In another example, when the user specifies one or more preferred languages and/or locales, messaging application 103a/103b may generate suggested responses in the user's preferred language. In various examples, suggested responses may be text responses, images, multimedia, etc.

In some implementations, machine learning may be implemented on messaging server 101, on client devices 115, or on both messaging server 101 and client devices 115. In some implementations, a simple machine learning model may be implemented on client device 115 (e.g., to permit operation of the model within memory, storage, and processing constraints of client devices) and a complex machine learning model may be implemented on messaging server 101. If a user does not provide consent for use of machine learning techniques, such techniques are not implemented. In some implementations, a user may selectively provide consent for machine learning to be implemented only on a client device 115. In these implementations, machine learning may be implemented on client device 115, such that updates to a machine learning model or user information used by the machine learning model are stored or used locally, and are not shared to other devices such as messaging server 101, server 135, or other client devices 115.

For the users that provide consent to receiving suggestions, e.g., based on machine-learning techniques, suggestions may be provided by messaging application 103. For example, suggestions may include suggestions of content (e.g., movies, books, etc.), schedules (e.g., available time on a user's calendar), events/venues (e.g., restaurants, concerts, etc.), and so on. In some implementations, if users participating in a conversation provide consent to use of conversation data, suggestions may include suggested responses to incoming messages that are based on conversation content. For example, if a first user of two users that have consented to suggestions based on conversation content, sends a message "do you want to grab a bite? How about Italian?" a response may be suggested to the second user, e.g. "@assistant lunch, italian, table for 2". In this example, the suggested response includes a bot (identified by the symbol @ and bot handle assistant). If the second user selects this response, the assistant bot is added to the conversation and the message is sent to the bot. A response from the bot may then be displayed in the conversation, and either of the two users may send further messages to the bot. In this example, the assistant bot is not provided access to the content of the conversation, and suggested responses are generated by the messaging application 103.

In certain implementations, the content of a suggested response may be customized based on whether a bot is already present in a conversation or is able to be incorporated into the conversation. For example, if it is determined that a travel bot could be incorporated into the messaging app, a suggested response to a question about the cost of plane tickets to France could be "Let's ask travel bot!"

In different implementations, suggestions, e.g., suggested responses, may include one or more of: text (e.g., "Terrific!"), emoji (e.g., a smiley face, a sleepy face, etc.), images (e.g., photos from a user's photo library), text generated based on templates with user data inserted in a field of the template (e.g., "her number is <Phone Number>" where the field "Phone Number" is filled in based on user data, if the user provides access to user data), links (e.g., Uniform Resource Locators), etc. In some implementations, suggested responses may be formatted and/or styled, e.g., using colors, fonts, layout, etc. For example, a suggested response that includes a movie recommendation may include descriptive text about the movie, an image from the movie, and a link to buy tickets. In different implementations, suggested responses may be presented as different types of user interface elements, e.g., text boxes, information cards, etc.

In different implementations, users are offered control over whether they receive suggestions, what types of suggestions they receive, a frequency of the suggestions, etc. For example, users may decline to receive suggestions altogether, or may choose specific types of suggestions, or to receive suggestions only during certain times of day. In another example, users may choose to receive personalized suggestions. In this example, machine learning may be used to provide suggestions, based on the user's preferences relating to use of their data and use of machine learning techniques.

Figure 2:
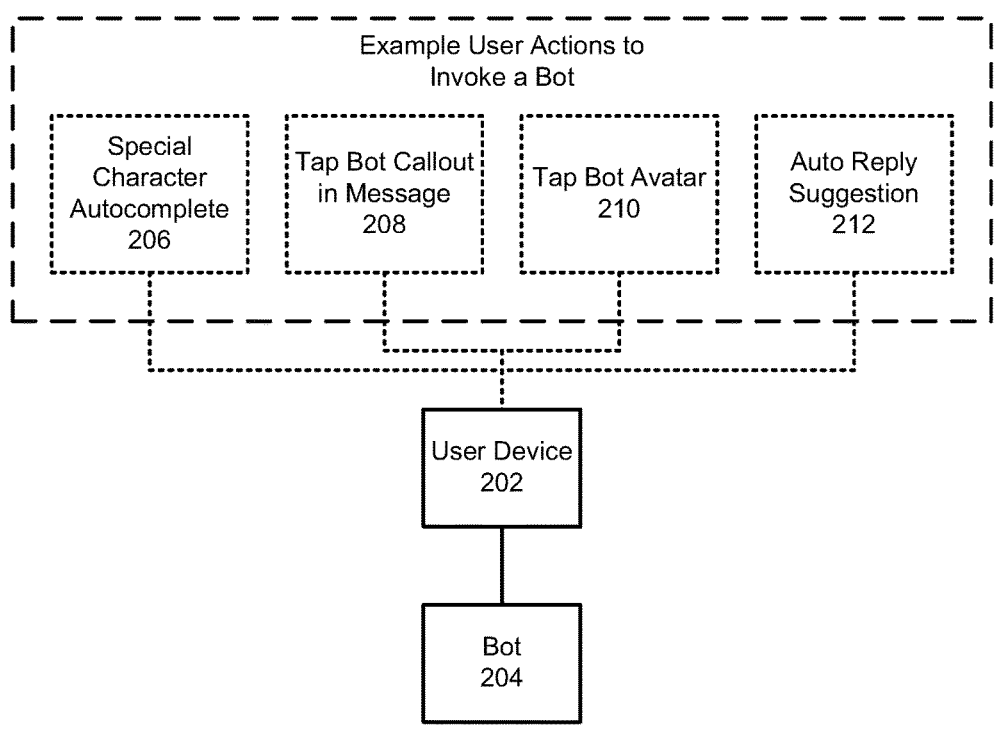
FIG. 2 is a diagram of example bot invocation events in accordance with some implementations.

FIG. 2 is a diagram of example bot invocation events in accordance with some implementations. In particular, a user device 202 is in communication with a bot 204. The bot 204 can be invoked via one or more events on the user device 202. The events can include special character autocomplete or manual typing 206, bot callout tapping in a message 208, bot avatar tapping 210, and selecting an auto reply suggestion 212.

The special character autocomplete or command can include input from a user of a special character (e.g., "@") followed by a bot name or handle. In this example event, the bot can be identified by a bot handle, e.g., the "@" symbol followed by a name of the bot (e.g., reservationbot, assistant, etc.) An example user interface element for special character autocomplete or command is shown at 402 in FIG. 4 and described below. Once a user enters the special character (e.g., "@") into a compose box or other text input area, the system can monitor the subsequent characters and attempt to automatically identify and suggest bots having a handle (e.g., "@bot") or a name (e.g., "Hotel Bot") that has a portion matching the characters being typed or otherwise inputted by the user. A user can select an autocomplete suggestion without having to type the full bot name or handle name.

Tapping (or otherwise selecting via touch, typing or voice input) a bot callout (e.g., 404 in FIG. 4) can invoke the bot associated with the callout. If the callout was associated with previous suggested responses, those responses may be recalled as shown in FIGS. 8-12 and described below. Tapping (or otherwise selecting via touch, typing or voice input) a bot avatar (e.g., 406 in FIG. 4). Tapping (or otherwise selecting via touch, typing or voice input) an auto replay suggestion (e.g., 408 in FIG. 4).

Figure 3:
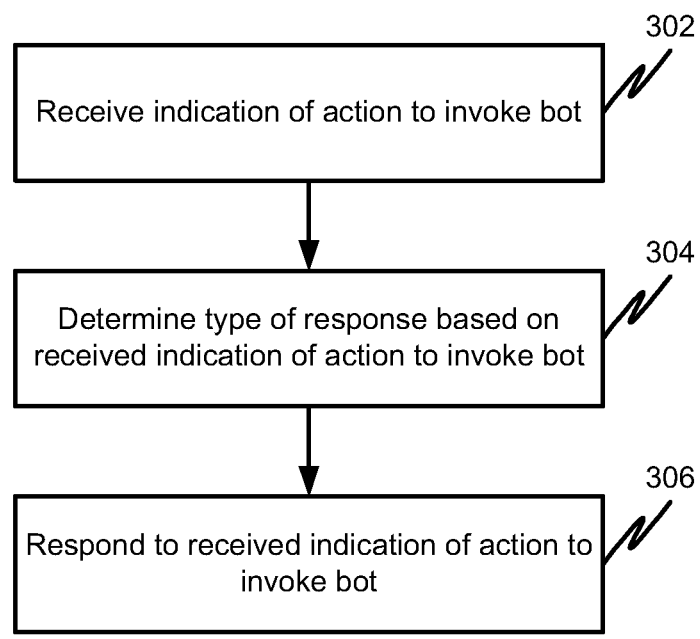
FIG. 3 is a flow diagram showing an example method of bot invocation in accordance with some implementations.

FIG. 3 is a flow diagram showing an example method of bot invocation in accordance with some implementations. Processing begins at 302 where an indication of an action to invoke a bot is received. The indication can include an indication of a special character bot command, a special character autocomplete selection, tapping a bot callout, tapping a bot avatar, and/or an indication of a selection of an auto reply suggestion. In some implementations, a bot can be automatically invoked (with or without one of the actions shown in FIG. 2) and the system can automatically determine which bot to invoke based on various information, such as, e.g., what the user is typing in after @ or other special character, what type of task a user seeks to perform or needs to perform based on user action or context of usage, whether a user is looking for information (what information the user is looking for), user voice command, etc. Processing continues to 304.

At 304, the type of response to the indication of an action to invoke a bot is determined. For example, if the indication is a selection of an auto reply suggestion, then the action may be to provide the auto reply to the bot or to the other participants in the conversation. In another example, if the indication is of a special character command, then the action may be determined to be an action responsive to the command. Processing continues to 306.

At 306, the bot responds to the received indication of an action to invoke the bot based on the response type determined in 304. For example, the bot may provide the suggested auto reply to the conversation, the bot may act on a received command, etc.

Figure 4:
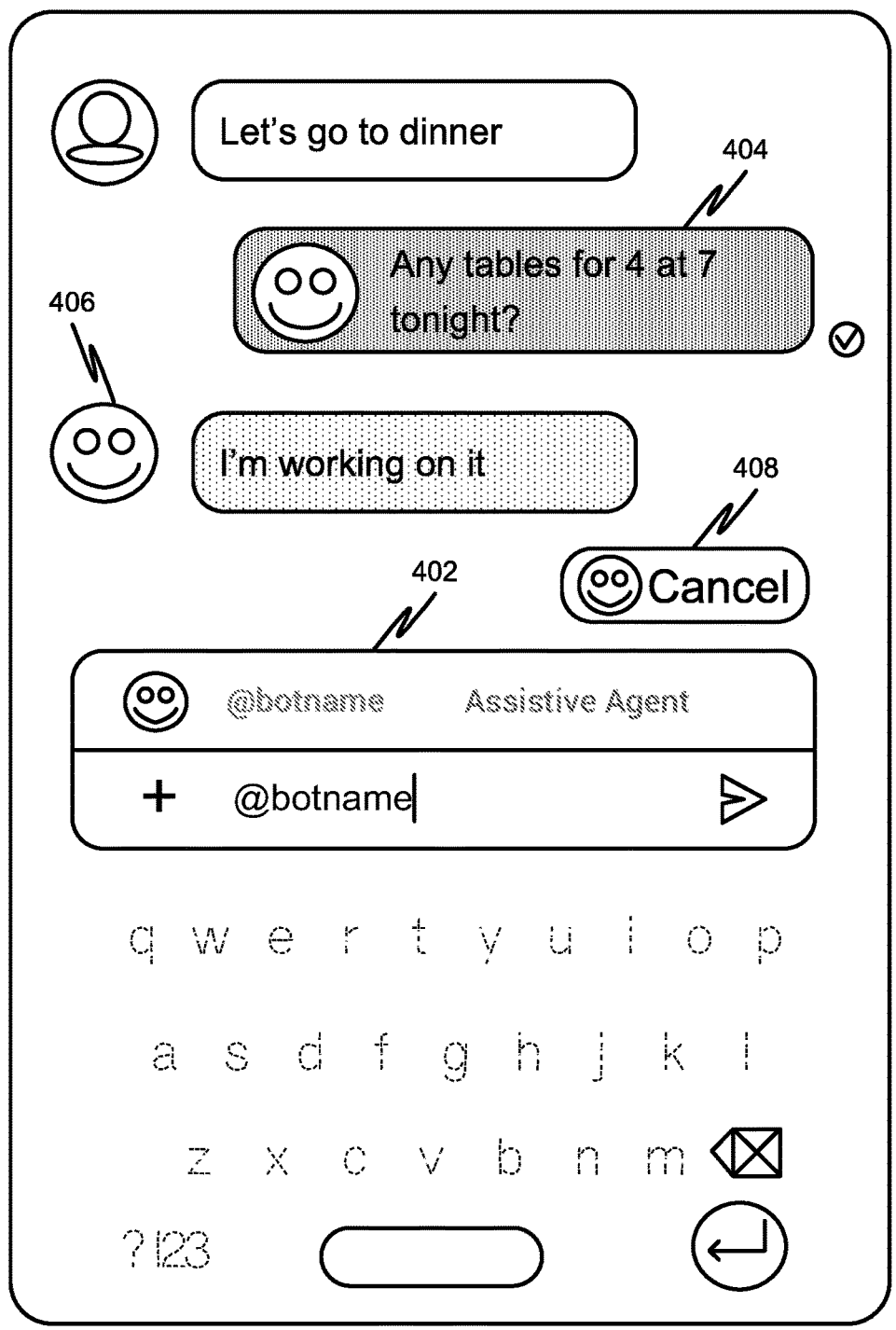
FIG. 4 is a diagram of a user interface showing example bot identification and invocation elements in accordance with some implementations.

FIG. 4 is a diagram of a user interface 400 showing example bot identification and invocation elements in accordance with some implementations. In particular, the user interface 400 includes an example special character autocomplete section 402 associated with a message compose box. The user interface also includes an example bot callout 404, which can represent a message or command previously sent to a bot. The user interface 400 includes an example bot avatar 406 and an example auto reply suggestion 408. There can be more than one bot callout, avatar or auto reply suggestion in a user interface.

Figure 5:
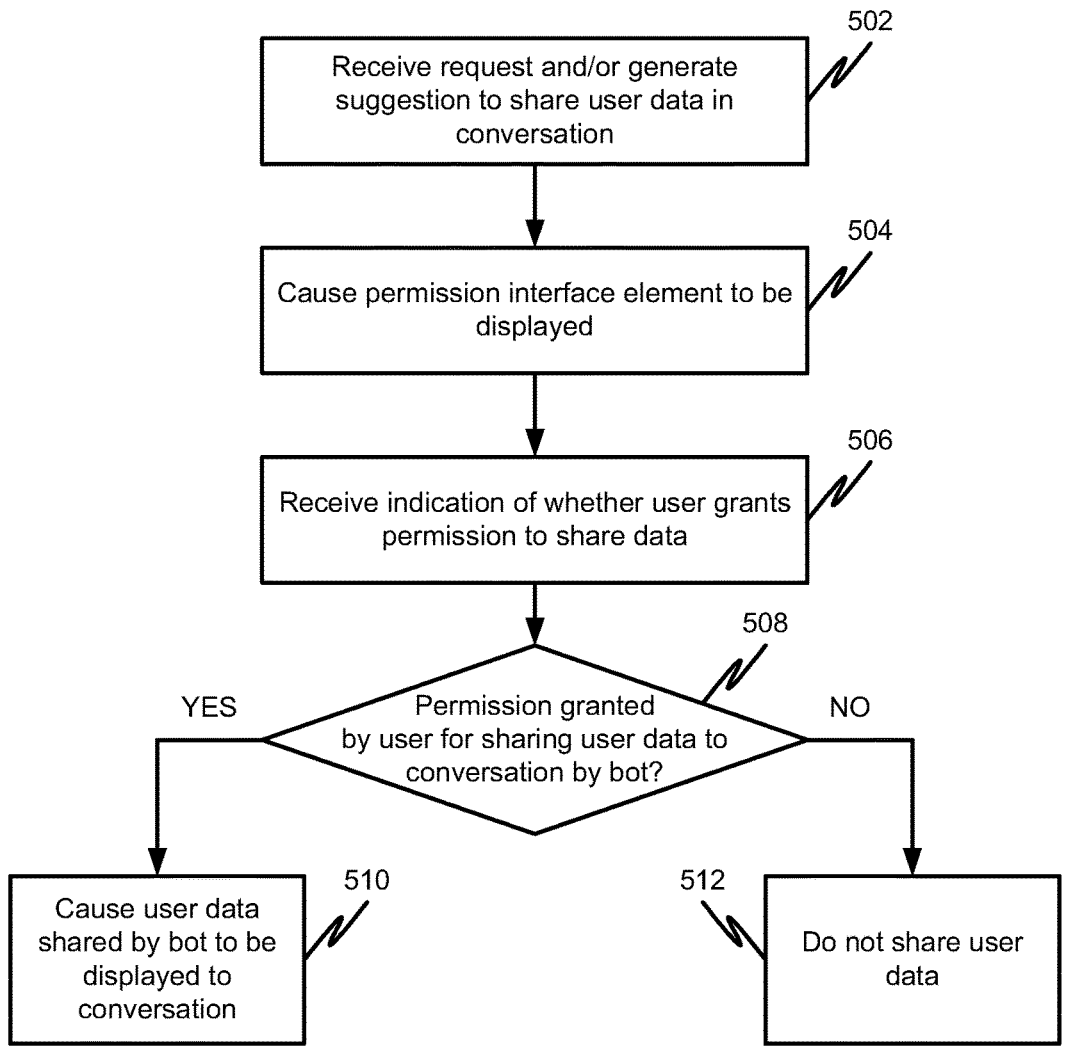
FIG. 5 is a flow diagram of an example method to manage user privacy during bot interactions in accordance with some implementations.

FIG. 5 is a flow diagram of an example method to manage user privacy during bot interaction in accordance with some implementations. Processing begins at 502, where a request from a user is received at a bot and/or a suggestion is generated, where the request or the suggestion may require user data to be shared. The request may include a requested task for the bot to perform (e.g., "share my flight data", "share my puppy photos", etc.). In some implementations, the request may be a command for the bot. For example, a request that includes a command for a reservation bot may be "@reservationbot find a hotel nearby," a request that includes a command for an assistant bot may be "@assistant send my flight details to Jim," etc. In this example, the bot is identified by a bot handle, e.g., the "@" symbol followed by a name of the bot (e.g., reservationbot, assistant, etc.) In order to perform the task and/or provide a response to the request, the bot may require access to user data. The user and the bot may be in a one-to-one communication arrangement. For example, a user may request a car service pick up and the car service bot may need to know the user's location in order to determine which cars may be available for picking up the user. In another example, a user may wish to make a hotel reservation at a nearby hotel and the hotel reservation bot may need to know the user's location. In yet another example, a bot may provide suggested responses for a user that include sharing user information (e.g., photos, calendar entries, flight schedules, etc.) and the suggestion bot may need to obtain the user's permission to access data that may be helpful for a suggested response and to provide such data as an actual response. The request may be a request from a user or may be an automatically generated request (e.g., from a suggested response bot, etc.). Processing continues to 504.

Figure 6:
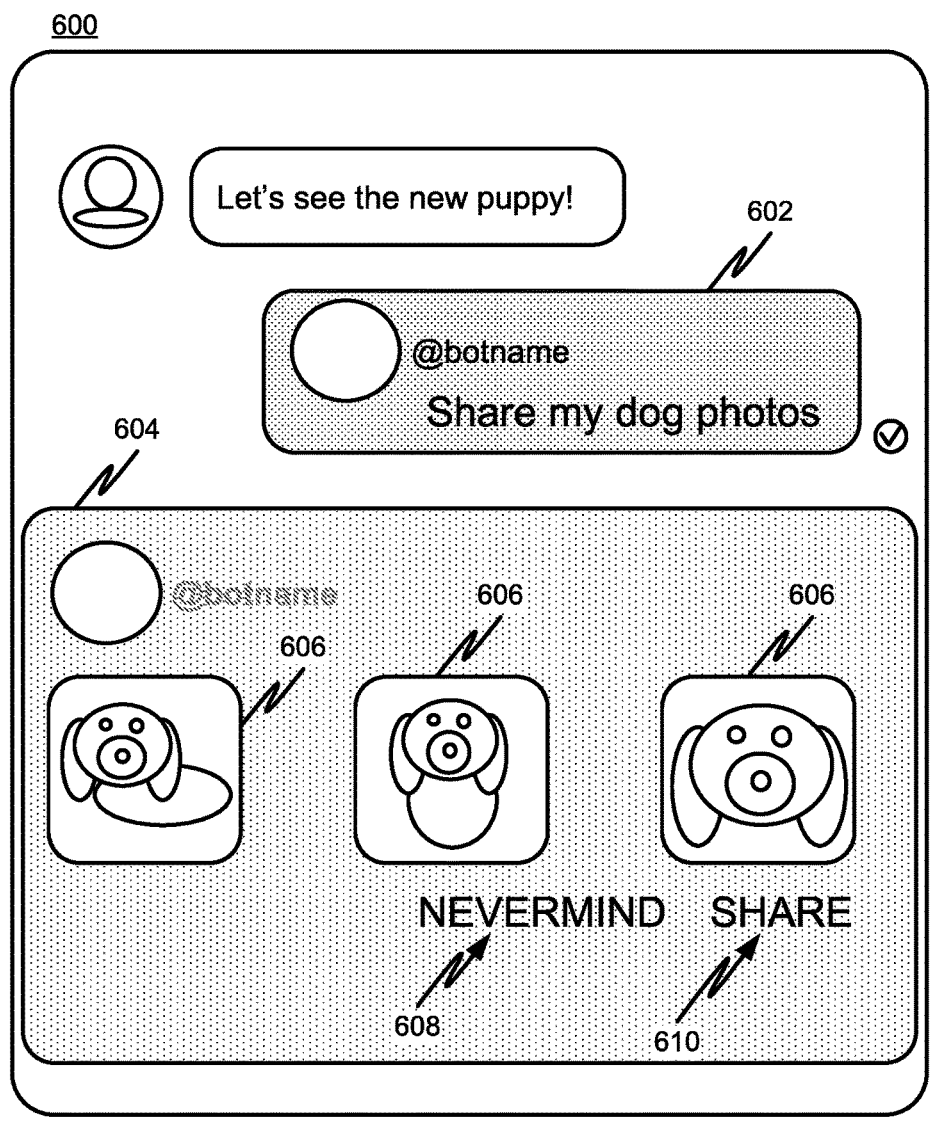
FIG. 6 is a diagram of an example user interface for managing user privacy during bot interactions in accordance with some implementations.

At 504, a permission user interface element is caused to be displayed to the user associated with the request or suggested response. An example of a permission request user interface element is shown in FIG. 6 and described below. The permission user interface element may also be presented as an audio prompt or using other user interface and/or output methods. Processing continues to 506.

At 506, an indication is received of whether the user grants the bot permission to share the user's data within an ongoing conversation that may be a one-to-one conversation or a group conversation. The indication can be received in the form of a user interface element selection (e.g., touching, tapping, selecting an on screen user interface button, via typing, audio input, gesture input, etc.) that indicates whether the user grants permission or not. For example, the user could select one of "NOT NOW" or "ALLOW" options shown in the permission user interface element of FIG. 6. Processing continues to 508.

At 508, the bot permission system determines whether permission was granted or not. Determining whether permission was granted can be accomplished by evaluating the indication received in step 506. If permission was granted, processing continues to 510. If permission was not granted, processing continues to 512.

At 510, an indication of user data is shared by the bot into the conversation according to the permission granted by the user.

At 512, the user data is not shared by the bot according to the permission not being granted by the user.

FIG. 6 is a diagram of an example user interface 600 with bot messaging in accordance with some implementations. In particular, the user interface 600 includes a message (602) from a user to a bot. Message 602 includes a request ("Share my dog photos") that may require use of the user's personal information, e.g., dog photos. In response to the request from the user, the bot may display a permission allow/disallow interface element (604) to the user seeking permission to share the user's data (606) in order to complete the request. The permission element 604 can include a description or sample (606) of what type of user data sharing permission is needed for and input elements for not allowing or allowing the bot permission to share the user's data, 608 and 610 respectively.

Figure 7:
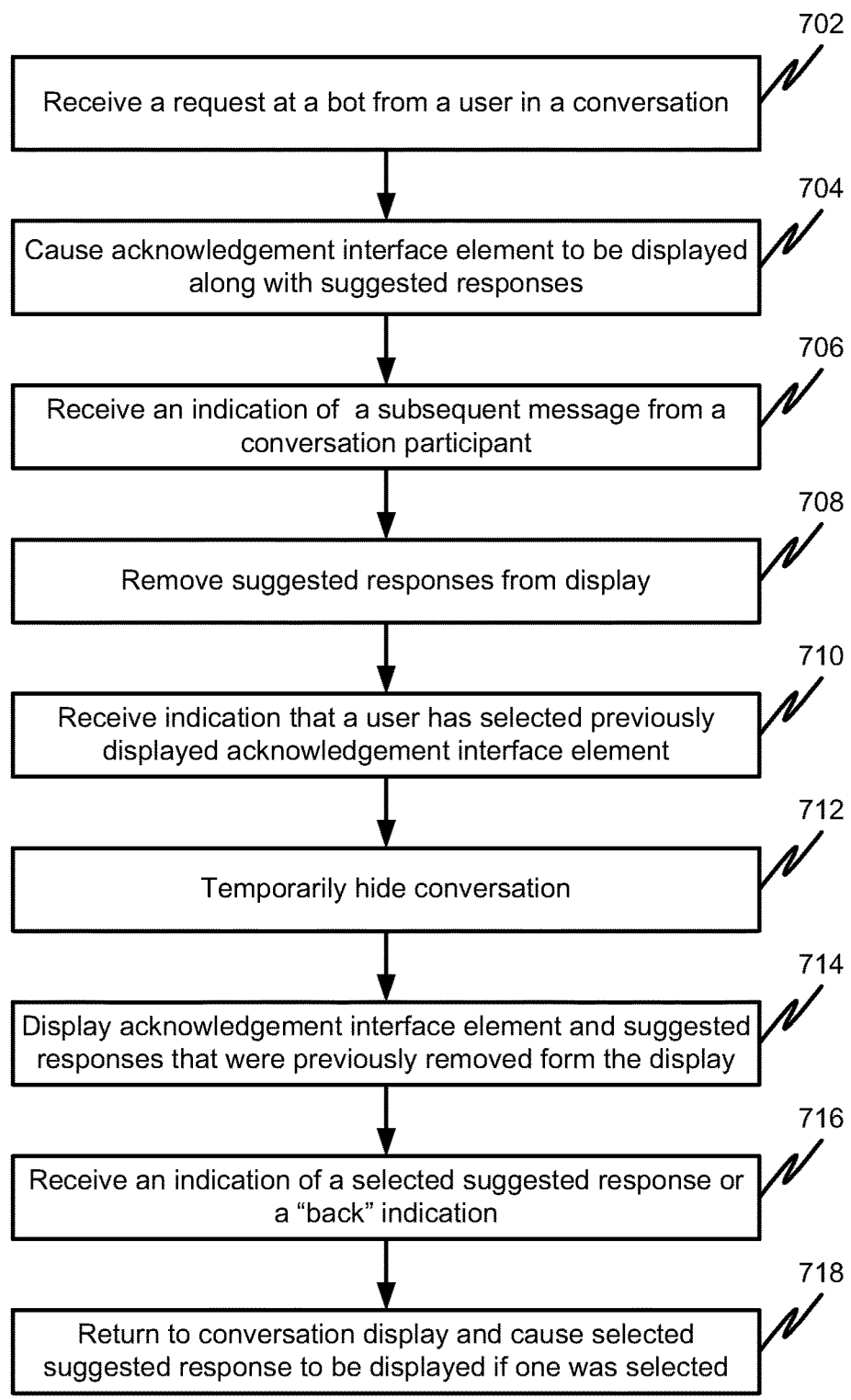
FIG. 7 is a flow diagram of an example method for recalling previous bot suggestions in accordance with some implementations.
Figure 8:
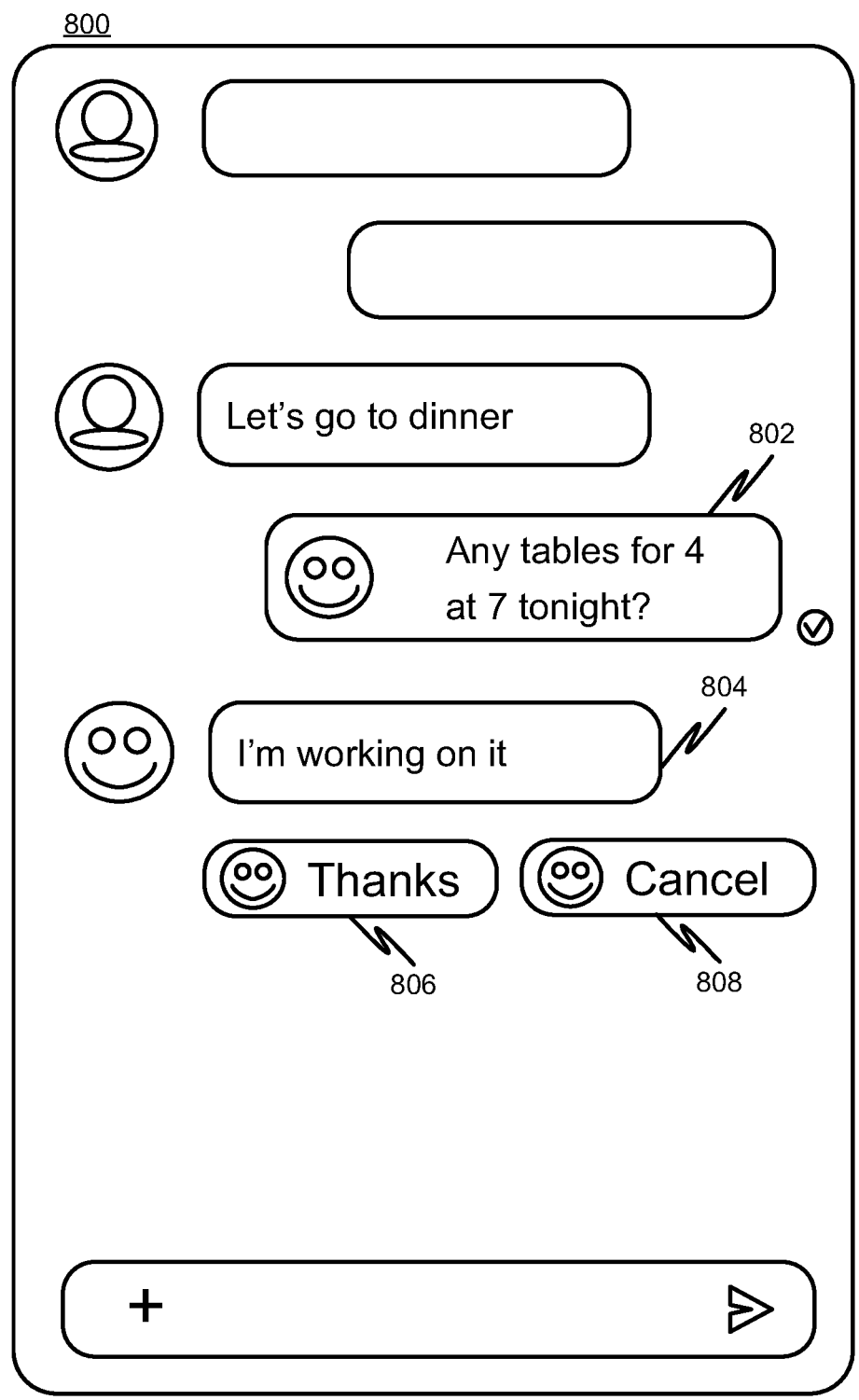
FIGS. 8-12 are diagrams of example user interfaces showing an example previous bot suggestion recall process in accordance with some implementations.

FIG. 7 is a flow diagram of an example method for recalling previous bot suggestions in accordance with some implementations. FIGS. 8-12 provide example user interface diagrams to help illustrate the method of FIG. 7 and are described in connection with the FIG. 7. Processing begins at 702 where a request from a user in a conversation is received at a bot. The request can come from a text command or other method as described herein. For example, a user could issue a command such as "@bot Any tables for 4 at 7 tonight?" as shown in FIG. 8 at 802. Processing continues to 704.

At 704, the bot can cause an acknowledgement interface element (e.g., 804 in FIG. 8) to be displayed. The acknowledgement element can provide an indication to the user that the bot is processing or working on the request or command. The acknowledgment can include one or more suggested auto replies (e.g., 806 and 808 in FIG. 8). Processing continues to 706.

Figure 9:
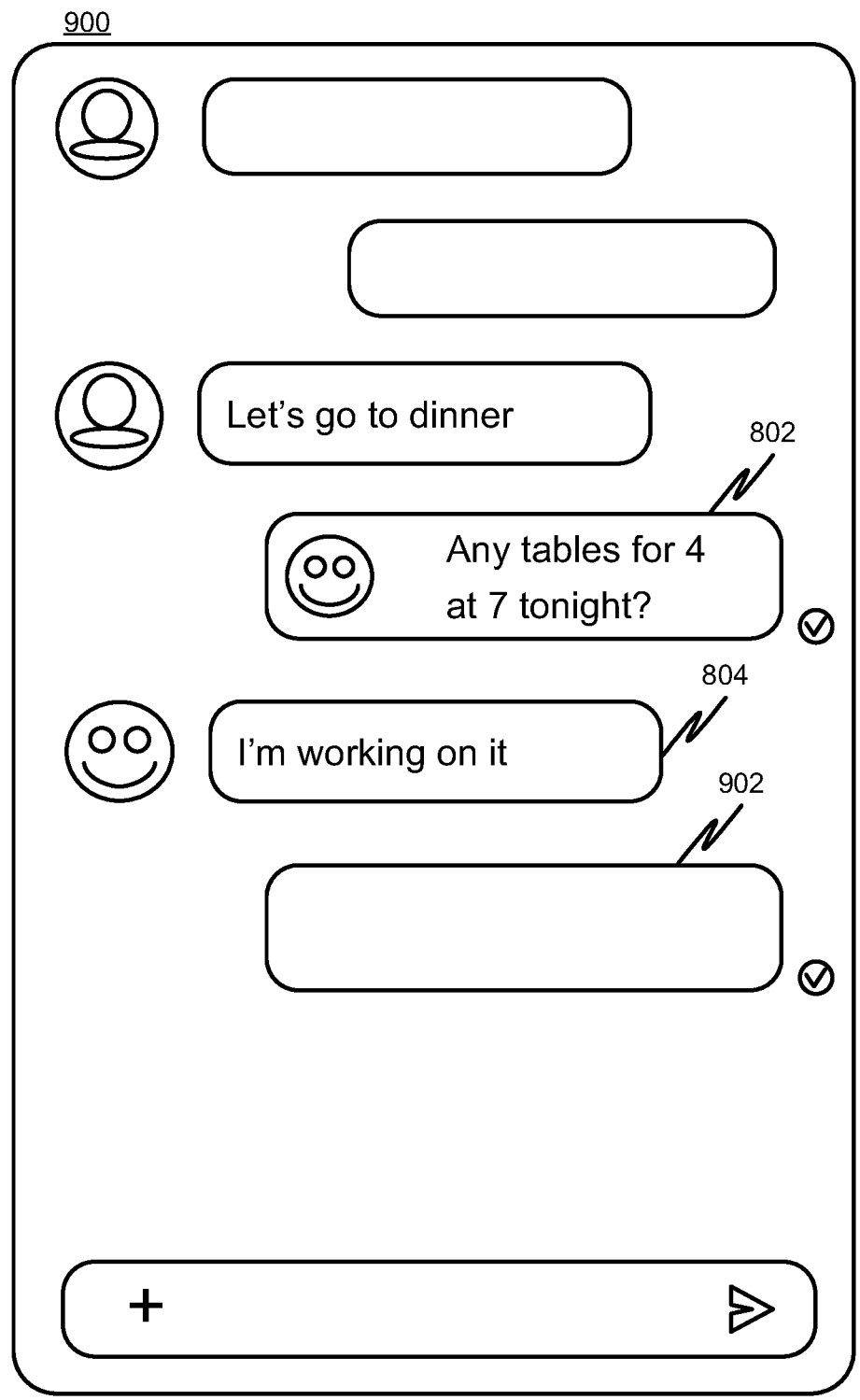
Figure 10:
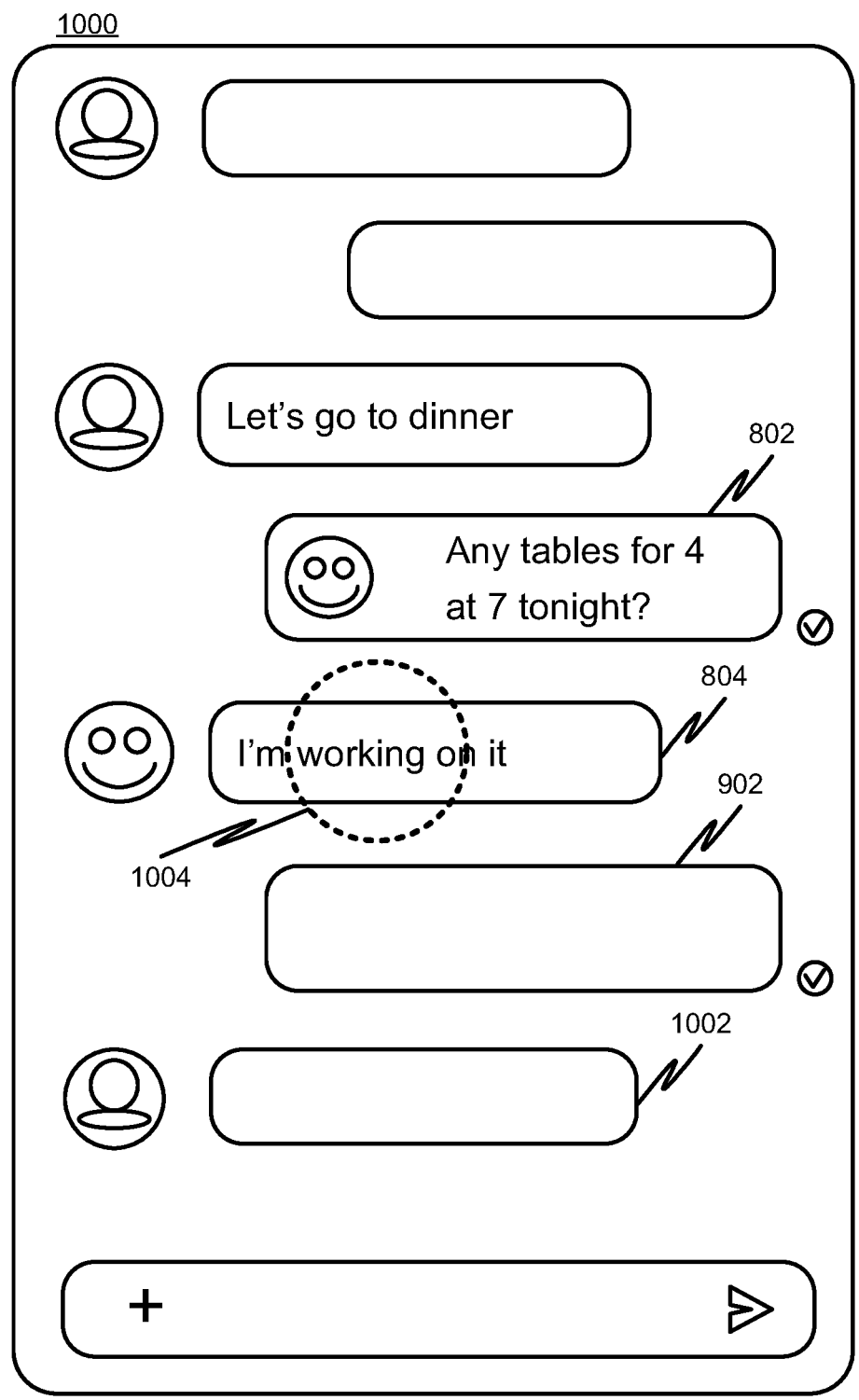

At 706, an indication of a subsequent message by a participant in the conversation (e.g., 902 in FIG. 9). Processing continues to 708.

At 708, the suggested responses are removed based on the determination of a subsequent message (e.g., 902). The removal of the suggested responses (806 and 808) is shown in FIG. 9 by the absence of the suggestions between 804 and 902. Processing continues to 710.

At 710, an indication is received that a user has tapped (or otherwise selected) (1004 in FIG. 10) a previously displayed acknowledgement message (e.g., 804) that had one or more suggested responses associated with it. Also in FIG. 10 a subsequent message 1002 is shown. By tapping or selected the previously displayed acknowledgement message, the user may be indicating an interest in recalling the suggested responses associated with the acknowledgement message. Processing continues to 712.

At 712, the conversation is optionally temporarily hidden or made less prominent through fading or other technique. Processing continues to 714.

Figure 11:
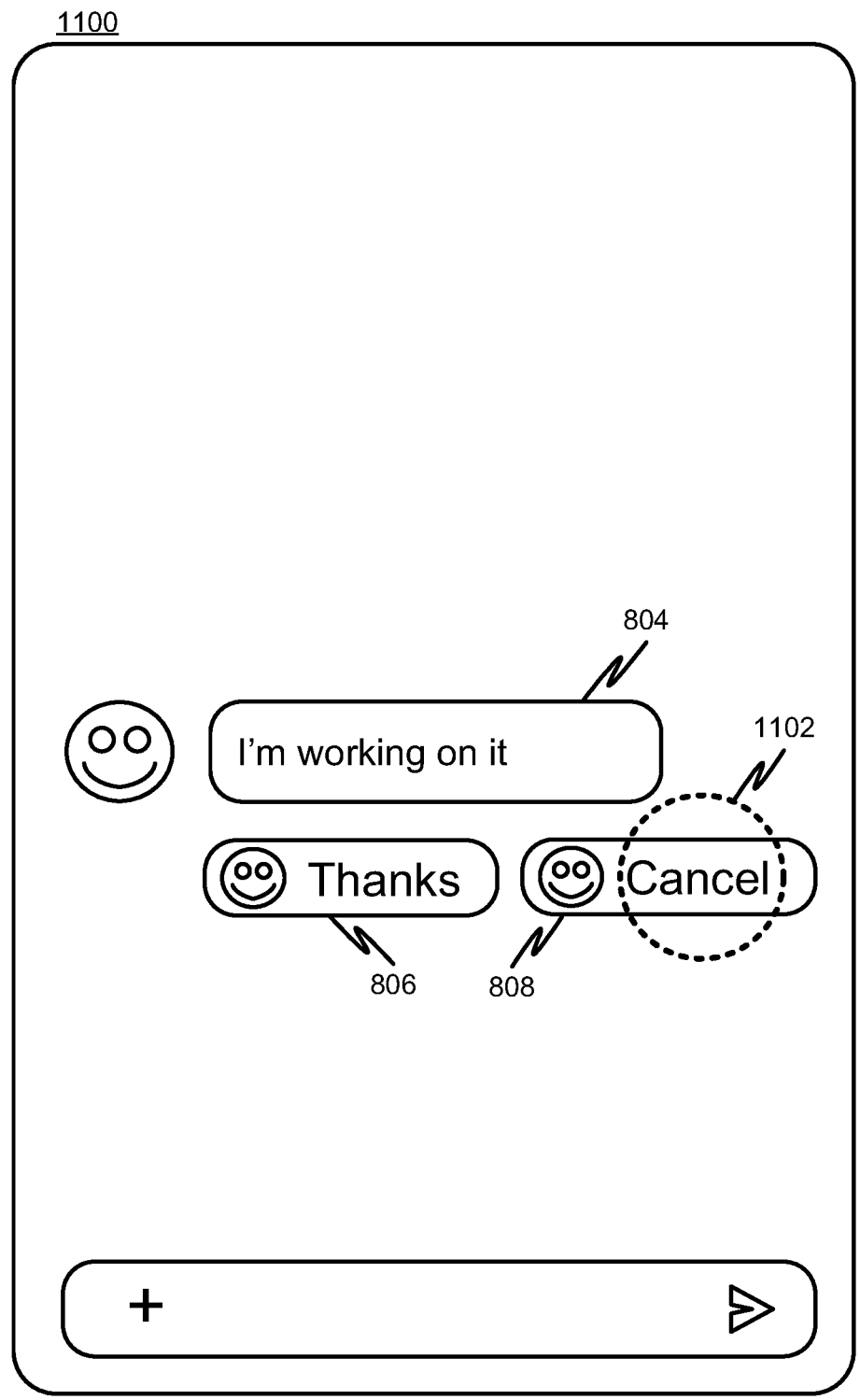
Figure 12:
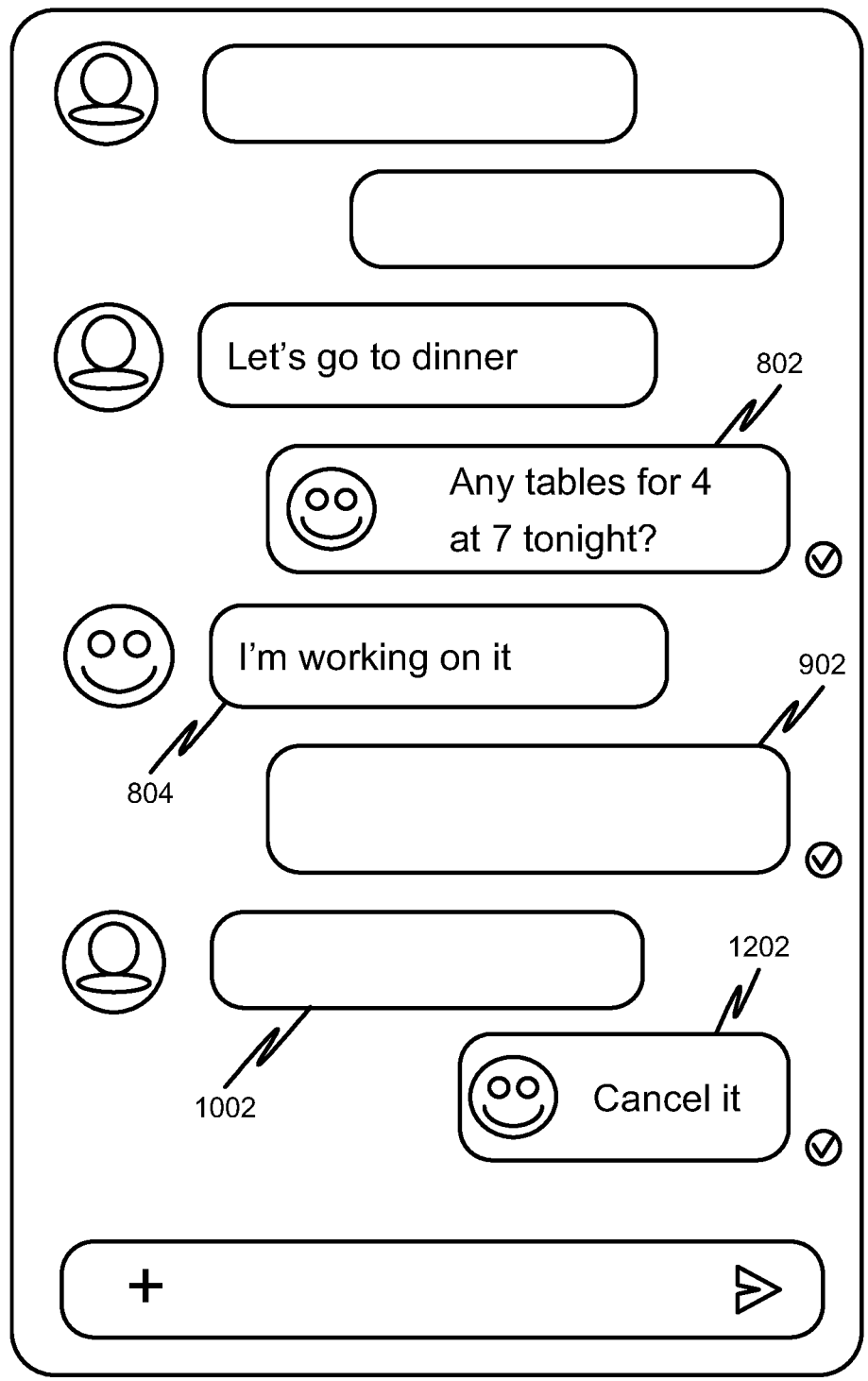

At 714, the previously displayed acknowledgement message (e.g., 802) and its associated suggested responses (806 and 808) are displayed as shown in FIG. 11. As alternative to hiding the conversation, the system could expand the acknowledgement message and display the suggested responses. Processing continues to 716.

At 716, an indication of a selection of one of the suggested responses is received. For example, an indication of selection of the "Cancel" suggested response (808) could be received, as shown by 1102 in FIG. 11. Alternatively, a "back" indication could be received to indicate that no suggested auto response has been selected and the user wishes to return to the conversation screen and the suggested responses can be removed from the display again. Processing continues to 718.

At 718, the display is returned to the conversation and the bot acts on the suggested response. For example, the bot could cause the "Cancel it" message to be display as shown at 1202 in FIG. 12.

Figure 13:
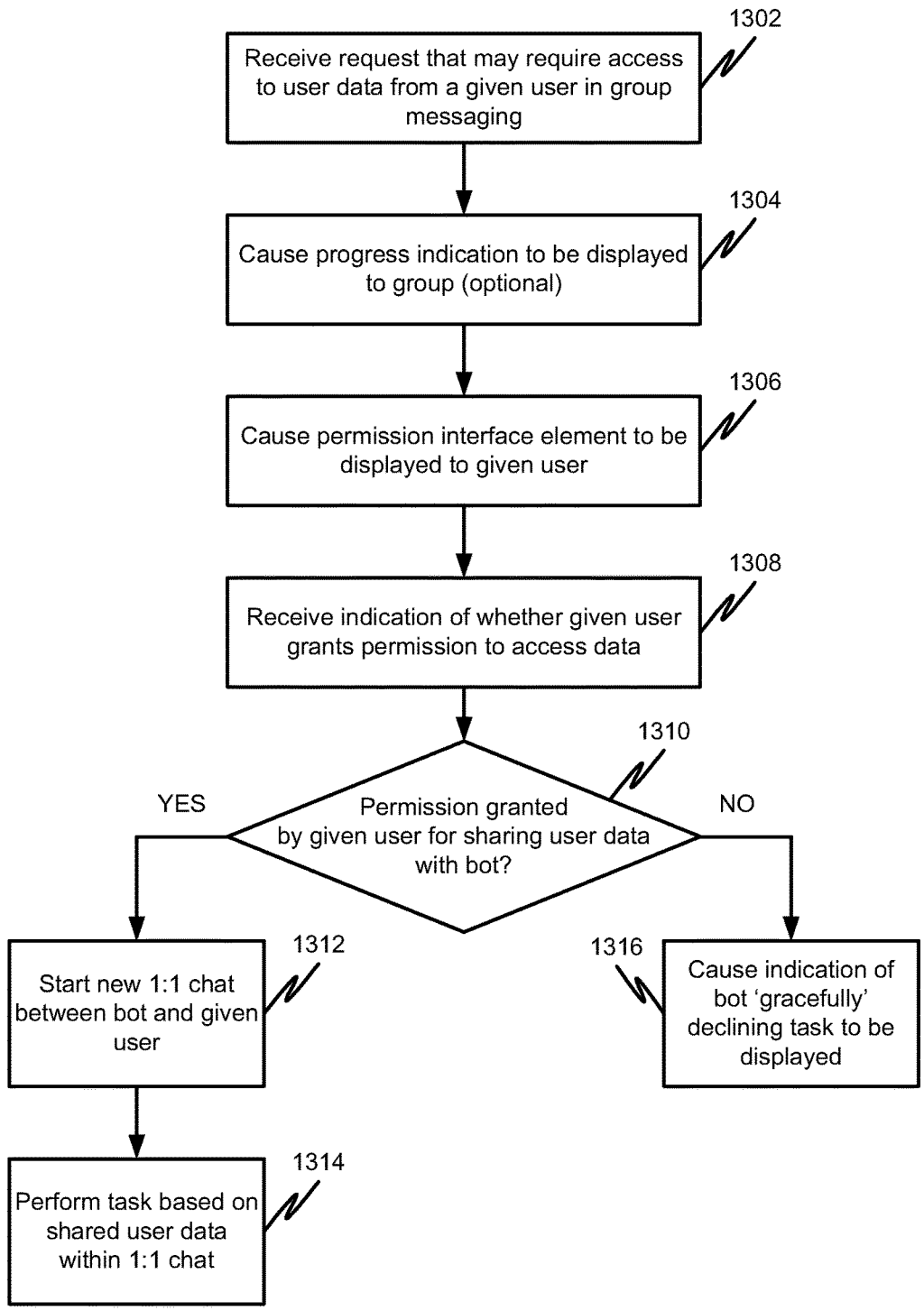
FIG. 13 is a flow diagram showing an example process for managing permissions in accordance with some implementations.

FIG. 13 is a flow diagram of an example method to manage bot permissions within a group messaging context (e.g., within a "group chat") in accordance with some implementations. Processing begins at 1302, where a request from a user is received at a bot. In order to perform a requested task and/or provide a response to the request, the bot may require access to user data. The user and the bot may be in a group communication arrangement with multiple users and/or bot. For example, in a communication session with multiple users, a user may request a car service pick up, e.g., for the multiple users. The car service bot may need to know the location of each user that is to be included in the pickup in order to determine which cars may be available for picking up the users. In another example, a user may wish to make a hotel reservation at a nearby hotel for the group of users participating in the conversation. In this example, the hotel reservation bot may need to know information about the group of users, e.g., names, payment information, etc. The request may be a request from a user or may be an automatically generated request (e.g., from a suggested response bot, etc.). Processing continues to 1304.

At 1304, a progress indication is optionally displayed by the bot and may be visible in the group conversation to the group or to the individual user making the request. For example, a car service bot may display a message such as "I'm working on it" in the group conversation. Processing continues to 1306.

At 1306, a permission user interface element is caused to be displayed to the user associated with the request. An example of a permission request user interface element is shown in FIG. 6 and described above. When a bot is requesting permission to access user data instead of sharing user data, the permission request user interface element may describe the user data that the bot needs access to instead of showing an example of the data the bot will share if given permission. The permission user interface element may also be presented as an audio prompt or using other user interface and/or output methods. Processing continues to 1308.

At 1308, an indication is received of whether one or more users grant the bot permission to access or obtain respective user data. The indication can be received in the form of a user interface element selection (e.g., touching, tapping, selecting an on screen user interface button, via typing, audio input, gesture input, etc.) that indicates whether the user grants permission or not. For example, the user could select one of "NOT NOW" or "ALLOW" shown in the permission user interface element of FIG. 6. Processing continues to 1310.

At 1310, the bot permission system determines whether permission was granted or not. Determining whether permission was granted can be accomplished by evaluating the indication received in step 1308. If permission was granted, processing continues to 1312. If permission was not granted, processing continues to 816.

Figure 14:
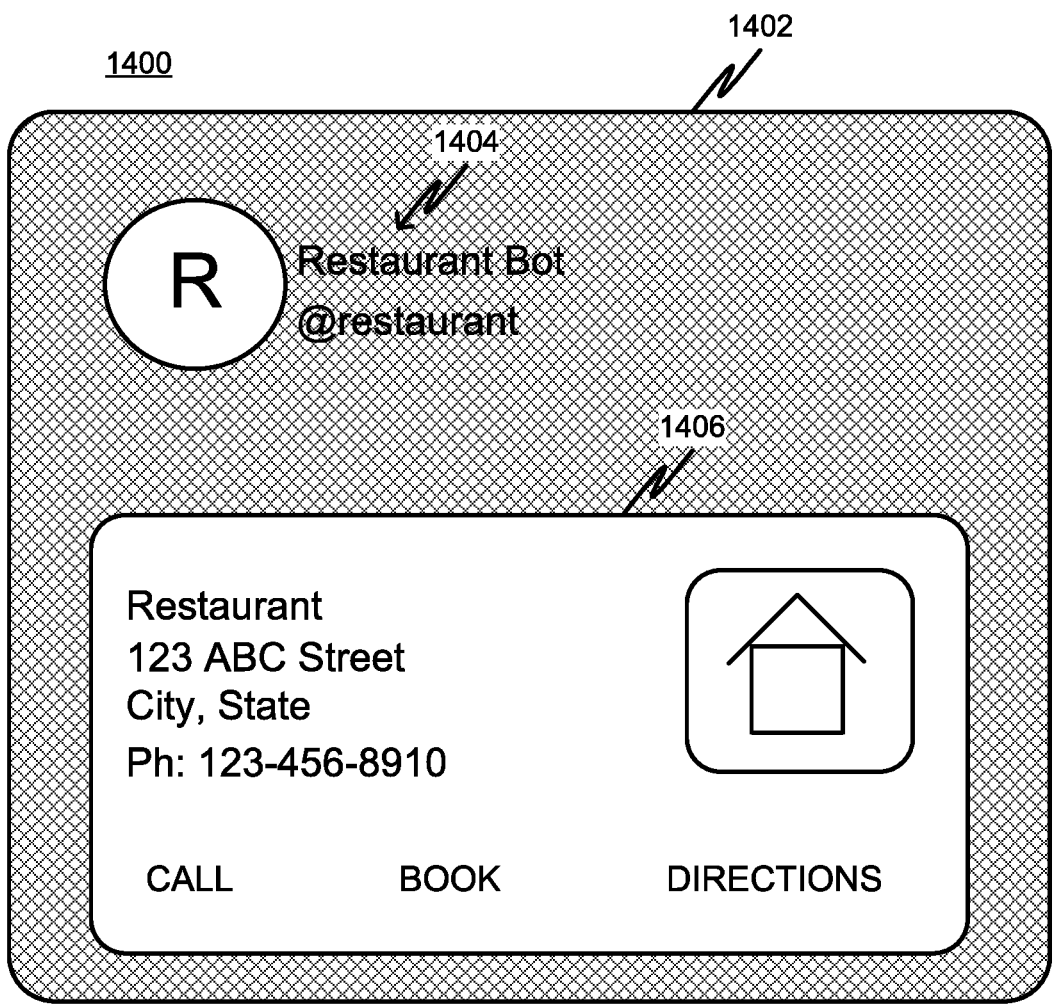
FIG. 14 is a diagram showing an example user interface themed for a given bot type in accordance with some implementations.
Figure 15:
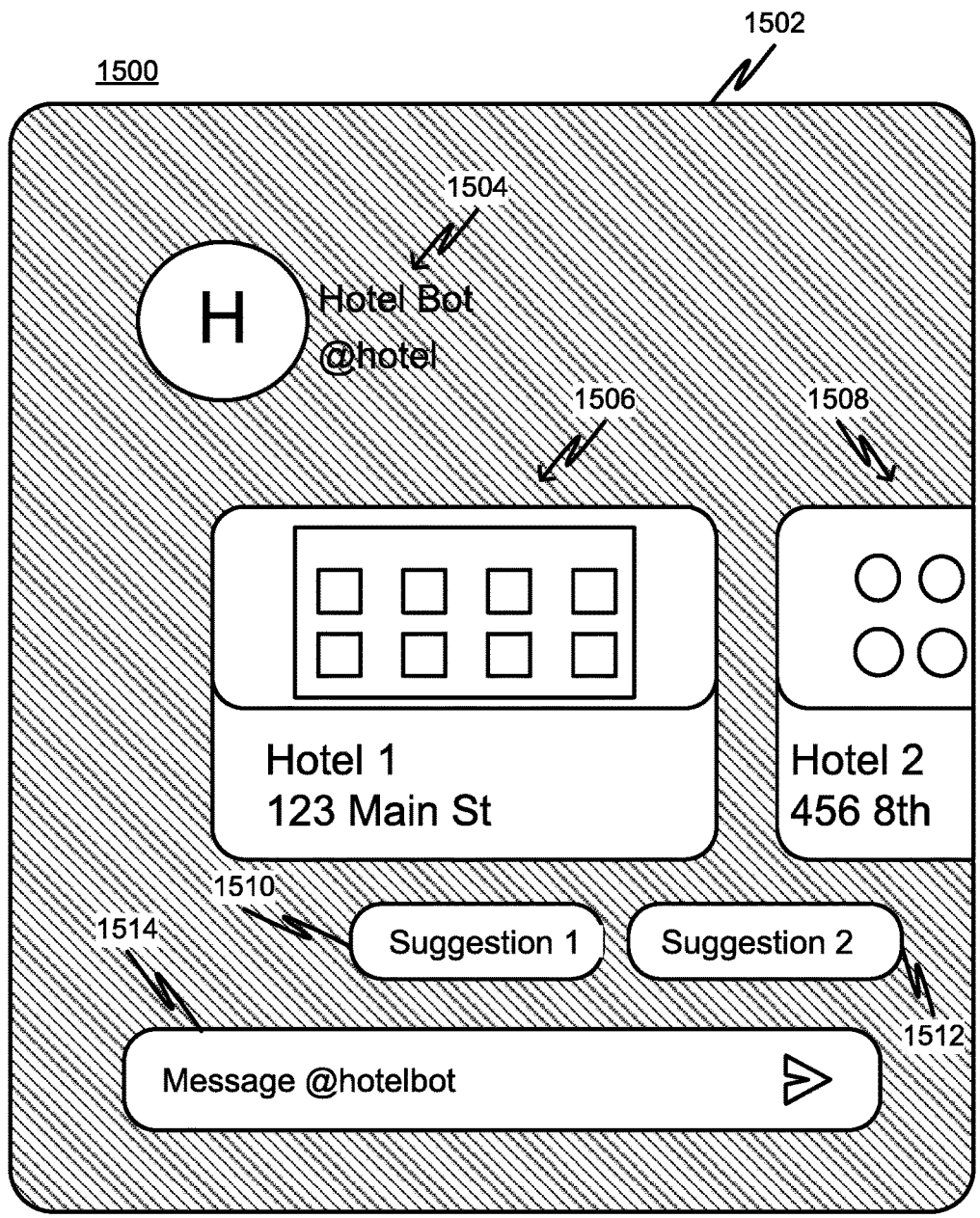
FIG. 15 is a diagram showing an example user interface themed for a given bot type in accordance with some implementations.

At 1312, the bot can start a one-to-one chat with the user. The one-to-one chat and the messages exchanged in the one-to-one chat are not visible to the group of users in the group messaging conversation. Examples of one-to-one chat user interfaces having different visual themes corresponding to respective bots (e.g., with visual themes corresponding to different respective companies, organizations, etc.) are shown in FIGS. 14 and 15. Processing continues to 1314.

At 1314, the bot may perform further processing to complete the task associated with the permissions that were granted within the one-to-one user messaging conversation. For example, a car service bot could continue to determine which cars may be in a location to provide car service to the user. In another example, a lodging bot could use shared user location to determine nearby accommodations that are vacant and available for rental.

At 1316, the bot can cause a "graceful" indication of declining the task to be displayed to the user within the group messaging conversation. For example, the bot could provide an indication such as "I wasn't able to get your location—I'm unable to schedule a car" or the like. The indication could be displayed on a graphical user interface or provided in the form of an audio cue or other output indication. The graceful aspect of the decline message can include a message that does not explicitly indicate that a user did not grant the bot permission to use the user's data. In different implementations, the indication may include different textual content, e.g., based on the request, or other factors. For example, an indication in response to user prohibiting access to location in the context of ordering a car may include textual content such as "Sorry, unable to get location," "I'm unable to find cars near you," "Car service not available," etc. In some implementations, different indications may be sent to different participants in a group conversation. In some implementations, indications may use different formats, e.g., text box, graphical indication, animated indication, etc. In some implementations, the indications may use different styles, e.g., boldface text, italicized text, fonts, colors, etc.

FIG. 14 is a diagram showing an example one-to-one user interface 1400 themed for a given bot type in accordance with some implementations. The example shown in FIG. 14 is for an example restaurant bot. The themed interface 1400 can include a particular background color, image, texture, etc. (1402). The themed interface 1400 can also include a logo, name and handle for the bot (1404). The themed interface can also include information provided by the bot, for example restaurant information 1406.

FIG. 15 is a diagram showing an example one-to-one user interface 1500 themed for a given bot type in accordance with some implementations. The example shown in FIG. 15 is for an example hotel bot. The themed interface 1500 can include a particular background color, image, texture, etc. (1502). The themed interface 1500 can also include a logo, name and handle for the bot (1504). The themed interface can also include information provided by the bot, for example restaurant information 1506-1508. The one-to-one interface 1500 also includes suggestion selection buttons 1510 and 1512 and a compose box 1514 to compose messages (e.g., commands, requests, etc.) for the bot.

Figure 16:
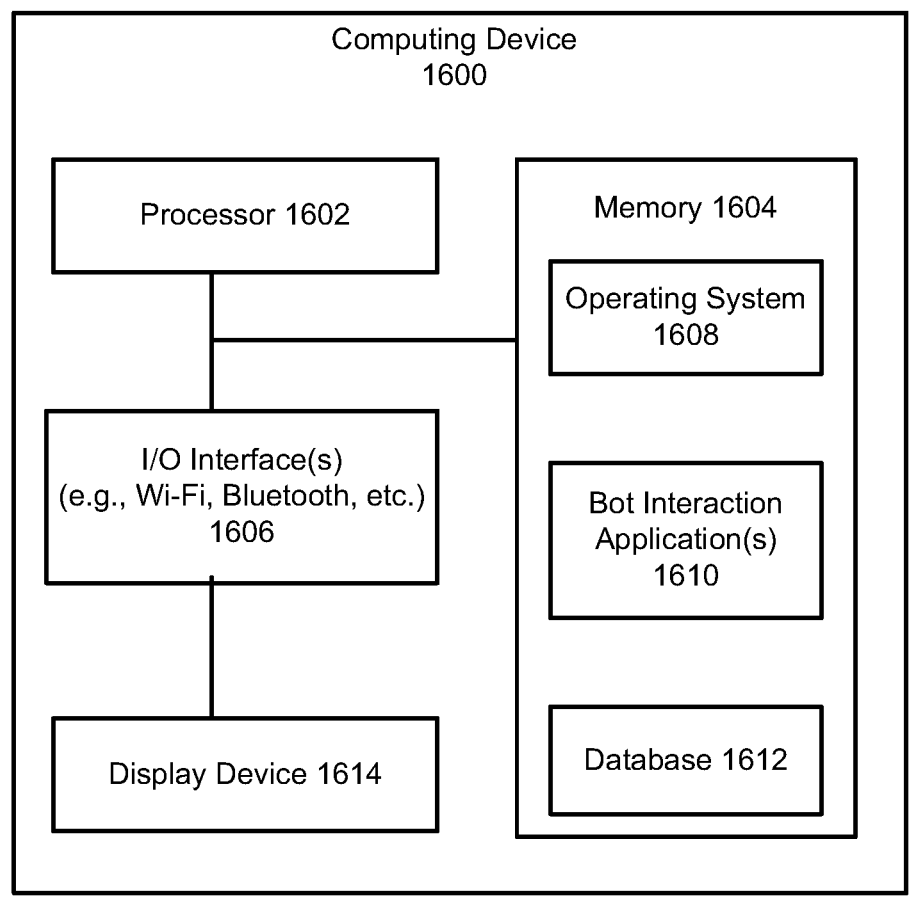
FIG. 16 is a diagram of an example computing device configured for bot interaction in accordance with some implementations.

FIG. 16 is a block diagram of an example computing device 1600 which may be used to implement one or more features described herein. In one example, computing device 1600 may be used to implement a client (or user) device, e.g., any of client devices 115a-115n shown in FIG. 1. Computing device 1600 can be any suitable computer system, server, or other electronic or hardware device as described above.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a user device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, computing device 1600 includes a processor 1602, a memory 1604, and input/output (I/O) interface 1606. Processor 1602 can be one or more processors and/or processing circuits to execute program code and control basic operations of the computing device 1600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1604 is typically provided in computing device 1600 for access by the processor 1602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1602 and/or integrated therewith. Memory 1604 can store software operating on the computing device 1600 by the processor 1602, including an operating system 1608 and one or more applications 1610 such as a messaging application, a bot interaction application, etc. In some implementations, the applications 1610 can include instructions that enable processor 1602 to perform functions described herein, e.g., one or more of the methods of FIGS. 3, 5, 7, and/or 13. For example, applications 1610 can include messaging and/or bot applications, including a program to manage bot permissions, user privacy, recalling old bot suggestions, and/or identifying bots as described herein. One or more of the applications can, for example, provide a displayed user interface responsive to user input to display selectable options or controls, and data based on selected options. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 1604 can alternatively be stored on any other suitable storage location or computer-readable medium. In addition, memory 1604 (and/or other connected storage device(s)) can store messages, permission settings, user preferences and related data structures, parameters, audio data, user preferences, and/or other instructions and data used in the features described herein in a database 1612. Memory 1604 and any other type of storage (magnetic disk, optical disk, magnetic tape, or other tangible media) can be considered "storage" or "storage devices."

The I/O interface 1606 can provide functions to enable interfacing the computing device 1600 with other systems and devices. Interfaced devices can be included as part of the computing device 1600 or can be separate and communicate with the computing device 1600. For example, network communication devices, wireless communication devices, storage devices, and input/output devices can communicate via the I/O interface 1606. In some implementations, the I/O interface 1606 can connect to interface devices such as input devices (keyboard, pointing device, touch screen, microphone, camera, scanner, sensors, etc.) and/or output devices (display device, speaker devices, printer, motor, etc.).

Some examples of interfaced devices that can connect to I/O interface 1606 can include a display device 1614 that can be used to display content, e.g., images, video, and/or a user interface of an output application as described herein. Display device 1614 can be connected to computing device 1600 via local connections (e.g., display bus) and/or via networked connections and can be any suitable display device. The display device 1614 can include any suitable display device such as a liquid crystal display (LCD), light emitting diode (LED), or plasma display screen, cathode ray tube (CRT), television, monitor, touch screen, 3-D display screen, or other visual display device. For example display device 1614 can be a flat display screen provided on a mobile device, multiple display screens provided in a goggles device, or a monitor screen for a computer device.

The I/O interface 1606 can interface to other input and output devices. Some examples include one or more cameras, which can capture image frames. Orientation sensors, e.g., gyroscopes and/or accelerometers, can provide sensor data indicating device orientation (which can correspond to view orientation in some implementations) and/or camera orientation. Some implementations can provide a microphone for capturing sound (e.g., voice commands, etc.), audio speaker devices for outputting sound, or other input and output devices.

For ease of illustration, FIG. 16 shows one block for the processor 1602, the memory 1604, the I/O interface 1606, the operating system 1608, and the bot interactions application 1610, respectively. These blocks may represent one or more processors or processing circuitries, operating systems, memories, I/O interfaces, applications, and/or software modules. In other implementations, computing device 1600 may not have all of the components shown and/or may have other elements including other types of elements instead of, or in addition to, those shown herein. While user devices (e.g., 115a-115n) are described as performing blocks and operations as described in some implementations herein, any suitable component or combination of components of user devices (e.g., 115a-115n) or similar devices, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device (CPLD), etc.), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user's phone number or partial phone number, user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time. Further example implementations are disclosed below.

1. A computer-executed method, comprising:
   providing a messaging application, on a first computing device associated with a first user, to enable communication between the first user and at least one other user;
   detecting, at the messaging application, a user request;
   programmatically determining that an action in response to the user request requires sharing of data associated with the first user;
   causing a permission interface to be rendered in the messaging application on the first computing device, the permission interface enabling the first user to approve or prohibit sharing of the data associated with the first user; and upon receiving user input from the first user indicating approval of the sharing of the data associated with the first user, accessing the data associated with the first user and sharing the data associated with the first user within the messaging application in response to the user request.

2. The computer-executed method of implementation 1, wherein the first user is a human user and the at least one other user is an assistive agent.

3. The computer-executed method of implementation 1 or 2, wherein the first user is a human user and the at least one other user includes a second human user, different from the first user, associated with a second computing device, and wherein the permission interface is rendered in the messaging application on the first computing device associated with the first user and the permission interface is not displayed on the second computing device associated with the second human user.

4. The computer-executed method of one of implementations 1 to 3, wherein the first user is a human user and the at least one other user includes a second human user, different from the first user, and an assistive agent, and wherein the user request is received from the first computing device associated with the first user, the method further comprising, in response to the user request, initiating a separate conversation in the messaging application, wherein the separate conversation includes the first user and the assistive agent, and excludes the second human user.

5. The computer-executed method of one of implementations 1 to 4, wherein detecting the user request comprises analyzing, by an assistive agent, one or more messages received in the messaging application from the first user to the assistive agent.

6. The computer-executed method of implementation 5, wherein the one or more messages include one or more of a text message, a multimedia message, and a command to an assistive agent.

7. The computer-executed method of one of implementations 1 to 6, further comprising providing one or more suggestions in the first messaging application based on input from at least one of the first user and the at least one other user.

8. The computer-executed method of implementation 7, further comprising causing the one or more suggestions to be rendered in the messaging application.

9. The computer-executed method of implementation 8, wherein the one or more suggestions are rendered as suggestion elements that, when selected by the first user, cause details about the suggestion to be displayed.

10. The computer-executed method of one of implementations 1 to 9, further comprising automatically invoking the assistive agent based on one or more actions of the first user.

11. The computer-executed method of one of implementations 1 to 10, wherein the assistive agent is invoked in response to one or more of:
 a special character command directed to the assistive agent;
 user selection of a user interface callout element associated with the assistive agent;
 user selection of an avatar corresponding to the assistive agent; and
 user selection of an auto reply suggestion provided by the assistive agent.

What is claimed is:

1. A computer-executed method, comprising:
 detecting, at a messaging application on a first computing device associated with a first user, a user request to determine if a second user is available at a predetermined time;
 determining that the first user invoked a first assistive agent by using a special character followed by a name of the first assistive agent;
 programmatically determining that an operation in response to the user request requires sharing of data associated with the first user;
 causing a permission interface to be rendered in the messaging application on the first computing device, the permission interface enabling the first user to approve or prohibit sharing of the data associated with the first user;
 upon receiving user input from the first user indicating approval of the sharing of the data associated with the first user, accessing the data associated with the first user and sharing the data associated with the first user with the first assistive agent in response to the user request;
 performing, by the first assistive agent, a task based on the data associated with the first user, wherein the task includes scheduling an event for the first user by contacting the second user or a second assistive agent to determine that the second user is available at the predetermined time.

2. The computer-executed method of claim 1, wherein the messaging application provides an option for the first user to receive suggestions from the first assistive agent during a certain time of day.

3. The computer-executed method of claim 1, wherein detecting the user request comprises analyzing, by the first assistive agent, one or more messages received in the messaging application wherein the messages are sent from the first user to the first assistive agent.

4. The computer-executed method of claim 3, wherein the one or more messages include one or more of a text message, a multimedia message, and a command to the first assistive agent.

5. The computer-executed method of claim 1, wherein the special character is an @ symbol.

6. The computer-executed method of claim 1, further comprising invoking the first assistive agent in response to one or more of:
 user selection of an avatar corresponding to the first assistive agent; or
 user selection of an auto reply suggestion provided by the first assistive agent.

7. The computer-executed method of claim 1, wherein the messaging application enables communication between the first user and the second user, different from the first user, associated with a second computing device, and wherein the permission interface is rendered in the messaging application on the first computing device associated with the first user and the permission interface is not displayed on the second computing device associated with the second user.

8. The computer-executed method of claim 1, wherein the messaging application enables communication between the first user, the second user, different from the first user, and the first assistive agent, and wherein the user request is received from the first computing device associated with the first user, the method further comprising, in response to the user request, initiating a separate conversation in the messaging application, wherein the separate conversation includes the first user and the first assistive agent, and excludes the second user.

9. The computer-executed method of claim 1, further comprising providing one or more suggestions in the messaging application based on input from at least one of the first user and at least one other user.

10. The computer-executed method of claim 9, further comprising causing the one or more suggestions to be displayed in the messaging application.

11. The computer-executed method of claim 10, wherein the one or more suggestions are rendered as suggestion elements that, when selected by the first user, cause details of a corresponding suggestion to be displayed.

12. A computer-executed method, comprising:
 determining that a first user invoked a first assistive agent by using a special character followed by a name of the first assistive agent;
 detecting, at a messaging application, user input corresponding to selection of a previously displayed acknowledgement message from the first assistive agent, wherein the previously displayed acknowledgement message is associated with one or more previously displayed suggested auto reply responses;
 causing the previously displayed suggested auto reply responses to be displayed;
 receiving an indication that a given one of the one or more previously displayed suggested auto reply responses was selected by a first user;
 sending the given one of the one or more previously displayed suggested auto reply responses to the first assistive agent and to a second user that participates in a conversation within the messaging application;
 sharing data associated with the first user with the first assistive agent; and
 performing, by the first assistive agent, a task based on the data associated with the first user, wherein the task includes determining if the second user is available at a predetermined time and scheduling an event for the first user by contacting the second user or a second assistive agent to determine that the second user is available at the predetermined time.

13. The computer-executed method of claim 12, further comprising invoking the first assistive agent in response to the user input.

14. The computer-executed method of claim 12, wherein the conversation includes the first user and at least one other user, wherein the first user is a first human user and the at least one other user includes the second user, different from the first human user, the first human user associated with a first computing device and the second user associated with a second computing device, and wherein the previously displayed acknowledgement message and the one or more previously displayed suggested auto reply responses are initially rendered in the messaging application on the first computing device associated with the first human user, and wherein providing the one or more previously displayed suggested auto reply responses to one or more of the first assistive agent and the conversation within the messaging application includes providing the one or more previously displayed suggested auto reply responses in the messaging application.

15. A system comprising:
   one or more hardware processors coupled to a non-transitory computer-readable medium having stored thereon on software instructions that, when executed by the one or more hardware processors, causes the one or more hardware processors to perform operations including:
      receiving a user request from a messaging application on a first computing device associated with a first user, the messaging application configured to enable communication between the first user and at least one other user, wherein the user request is used to determine if the at least one other user is available at a predetermined time;
      determining that the first user invoked a first assistive agent by using a special character followed by a name of the first assistive agent;
      programmatically determining that an operation in response to the user request requires sharing of data associated with the first user;
      causing a permission interface to be rendered in the messaging application on the first computing device, the permission interface enabling the first user to approve or prohibit sharing of the data associated with the first user;
      upon receiving user input from the first user indicating approval of the sharing of the data associated with the first user, accessing the data associated with the first user and sharing the data associated with the first user within the messaging application and with the first assistive agent in response to the user request; and
      performing, by the first assistive agent, a task based on the data associated with the first user, wherein the task includes scheduling an event for the first user by contacting the at least one other user or a second assistive agent to determine that the at least one other user is available at the predetermined time.

16. The system of claim 15, wherein the messaging application provides an option for the first user to receive suggestions from the first assistive agent during a certain time of day.

17. The system of claim 16, wherein detecting the user request comprises analyzing, at the first assistive agent, one or more messages received in the messaging application from the first user to the first assistive agent.

18. The system of claim 15, wherein the first user is a human user and the at least one other user includes a second human user, different from the first user, associated with a second computing device, and wherein the permission interface is rendered in the messaging application on the first computing device associated with the first user and the permission interface is not displayed on the second computing device associated with the second human user.

19. The system of claim 15, wherein the first user is a human user and the at least one other user includes a second human user, different from the first user, and the first assistive agent and wherein the user request is received from the first computing device associated with the first user, the operations further including, in response to the user request, initiating a separate conversation in the messaging application, wherein the separate conversation includes the first user and the first assistive agent, and does not include the second human user.

20. The system of claim 15, further comprising providing one or more suggestions to the messaging application based on input from at least one of the first user and the at least one other user.

* * * * *